(12) United States Patent
Ruszczyk et al.

(10) Patent No.: US 6,940,874 B2
(45) Date of Patent: Sep. 6, 2005

(54) METHOD FOR REDUCING INTERFERENCE FROM INITIALIZING NETWORK DEVICES IN A DATA-OVER-CABLE SYSTEM

(75) Inventors: Chester A. Ruszczyk, Medford, MA (US); David Willming, Palatine, IL (US)

(73) Assignee: 3Com Corporation, Marlborough, MA (US)

( * ) Notice: Subject to any disclaimer, the term of this patent is extended or adjusted under 35 U.S.C. 154(b) by 864 days.

(21) Appl. No.: 09/727,069

(22) Filed: Nov. 30, 2000

(65) Prior Publication Data

US 2002/0101883 A1 Aug. 1, 2002

(51) Int. Cl.⁷ .............................. H04L 12/00; H04J 3/06
(52) U.S. Cl. ........................ 370/516; 370/458; 725/114; 725/117; 725/144; 725/148
(58) Field of Search ................................ 370/252, 270, 370/458, 461, 462, 480, 486, 503, 516, 210, 211, 241, 241.1, 449, 485; 725/114, 117, 144, 148, 111, 116

(56) References Cited

U.S. PATENT DOCUMENTS

| | | |
|---|---|---|
| 4,644,533 A | 2/1987 | Braff et al. |
| 4,881,263 A | 11/1989 | Herbison et al. ............... 380/21 |
| 4,996,685 A | 2/1991 | Farese et al. |
| 5,014,234 A | 5/1991 | Edwards, Jr. ................ 364/900 |
| 5,138,712 A | 8/1992 | Corbin ........................ 395/700 |
| 5,301,273 A | 4/1994 | Konishi ....................... 395/200 |
| 5,347,304 A | 9/1994 | Moura et al. .................. 348/12 |
| 5,430,727 A | 7/1995 | Callon ...................... 370/85.13 |
| 5,442,749 A | 8/1995 | Northcutt et al. ....... 395/200.09 |
| 5,488,412 A | 1/1996 | Majeti et al. .................. 348/10 |
| 5,489,897 A | 2/1996 | Inoue .................... 340/870.39 |
| 5,528,595 A | 6/1996 | Walsh et al. ............. 370/85.13 |
| 5,583,931 A | 12/1996 | Schneider et al. ........... 379/399 |
| 5,586,121 A | 12/1996 | Moura et al. ................ 370/404 |
| 5,598,410 A | 1/1997 | Stone ......................... 370/469 |
| 5,600,717 A | 2/1997 | Schneider et al. ........... 379/399 |
| 5,606,606 A | 2/1997 | Schneider et al. ........... 379/399 |
| 5,608,446 A | 3/1997 | Carr et al. ...................... 348/6 |
| 5,610,910 A | 3/1997 | Focsaneanu et al. ........ 370/351 |
| 5,623,542 A | 4/1997 | Schneider et al. ........... 379/399 |
| 5,623,601 A | 4/1997 | Vu ......................... 395/187.01 |
| 5,636,211 A | 6/1997 | Newlin et al. ............... 370/465 |

(Continued)

FOREIGN PATENT DOCUMENTS

WO WO 00/67385 11/2000

OTHER PUBLICATIONS

"Baseline Privacy Interface Specification (Interim) SP–BPI–101–970922", MCNS Holdings, L.P., 1997, pp. ii to 65.

(Continued)

Primary Examiner—Hassan Kizou
Assistant Examiner—Ahmed Elallam
(74) Attorney, Agent, or Firm—McDonnell Boehnen Hulbert & Berghoff LLP

(57) ABSTRACT

Methods for reducing interference from initializing network devices in a data-over-cable system. The method includes aligning Initial Maintenance intervals for multiple upstream channels of the data-over-cable system. A cable modem termination system determines if usage intervals for the upstream channels may accommodate Initial Maintenance intervals that start at a common time. If so, the cable modem termination system constructs Bandwidth Allocation MAP messages for the usage intervals that contain Initial Maintenance intervals timed to start at the common time. In response to the MAP messages, initializing network devices range when there are no scheduled data transmissions on any upstream channel. The method may shorten a cable modem's time for ranging and may decrease collisions with data transmissions on the upstream paths when cable modems try to initialize.

12 Claims, 12 Drawing Sheets

U.S. PATENT DOCUMENTS

| | | | | |
|---|---|---|---|---|
| 5,675,732 | A | 10/1997 | Majeti et al. | 395/200.01 |
| 5,675,742 | A | 10/1997 | Jain et al. | 395/200 |
| 5,708,654 | A | 1/1998 | Arndt et al. | 370/242 |
| 5,710,885 | A | 1/1998 | Bondi | 395/200.54 |
| 5,724,510 | A | 3/1998 | Arndt et al. | 395/200.5 |
| 5,761,602 | A | 6/1998 | Wagner et al. | 455/3.1 |
| 5,778,181 | A | 7/1998 | Hidary et al. | 395/200.48 |
| 5,784,597 | A | 7/1998 | Chiu et al. | 395/552 |
| 5,790,198 | A | 8/1998 | Roop et al. | 348/460 |
| 5,790,548 | A | 8/1998 | Sistanizadeh et al. | 370/401 |
| 5,790,677 | A | 8/1998 | Fox et al. | 380/24 |
| 5,790,770 | A | 8/1998 | McClure et al. | 395/200.61 |
| 5,790,806 | A | 8/1998 | Koperda | 395/200.82 |
| 5,793,747 | A | 8/1998 | Kline | 370/230 |
| 5,799,086 | A | 8/1998 | Sudia | 380/23 |
| 5,805,804 | A | 9/1998 | Laursen et al. | 395/200.02 |
| 5,809,252 | A | 9/1998 | Beighe et al. | 395/200.57 |
| 5,812,819 | A | 9/1998 | Rodwin et al. | 395/500 |
| 5,815,664 | A | 9/1998 | Asano | 395/200.57 |
| 5,818,845 | A | 10/1998 | Moura et al. | 370/449 |
| 5,819,028 | A | 10/1998 | Manghirmalani et al. | 395/185.1 |
| 5,819,042 | A | 10/1998 | Hansen | 395/200.52 |
| 5,828,655 | A | 10/1998 | Moura et al. | 370/236 |
| 5,828,666 | A | 10/1998 | Focsaneanu et al. | 370/389 |
| 5,835,720 | A | 11/1998 | Nelson et al. | 395/200.54 |
| 5,835,727 | A | 11/1998 | Wong et al. | 395/200.68 |
| 5,841,777 | A | 11/1998 | Cohen | 370/433 |
| 5,852,721 | A | 12/1998 | Dillon et al. | 395/200.47 |
| 5,854,901 | A | 12/1998 | Cole et al. | 709/245 |
| 5,859,852 | A | 1/1999 | Moura et al. | 370/449 |
| 5,864,679 | A | 1/1999 | Kanai et al. | 709/238 |
| 5,870,134 | A | 2/1999 | Laubach et al. | 348/12 |
| 5,872,523 | A | 2/1999 | Dellaverson et al. | 340/825.52 |
| 5,884,024 | A | 3/1999 | Lim et al. | 395/187.01 |
| 5,894,479 | A | 4/1999 | Mohammed | 370/401 |
| 5,903,558 | A | 5/1999 | Jones et al. | 370/351 |
| 5,909,549 | A | 6/1999 | Compliment et al. | 709/223 |
| 5,913,037 | A | 6/1999 | Spofford et al. | 395/200.56 |
| 5,915,119 | A | 6/1999 | Cone | 395/750.02 |
| 5,922,049 | A | 7/1999 | Radia et al. | 709/220 |
| 5,922,051 | A | 7/1999 | Sidey | 709/223 |
| 5,923,659 | A | 7/1999 | Curry et al. | 370/401 |
| 5,926,458 | A | 7/1999 | Yin | 370/230 |
| 5,929,850 | A | 7/1999 | Broadwin et al. | 345/327 |
| 5,941,988 | A | 8/1999 | Bhagwat et al. | 713/201 |
| 5,943,604 | A | 8/1999 | Chen et al. | 455/5.1 |
| 5,954,797 | A | 9/1999 | Sidey | 709/223 |
| 5,958,007 | A | 9/1999 | Lee et al. | 709/219 |
| 5,960,177 | A | 9/1999 | Tanno | 395/200.59 |
| 5,974,453 | A | 10/1999 | Andersen et al. | 709/220 |
| 5,982,748 | A | 11/1999 | Yin et al. | 370/232 |
| 5,987,524 | A | 11/1999 | Yoshida et al. | 709/245 |
| 5,991,292 | A | 11/1999 | Focsaneanu et al. | 370/352 |
| 5,991,306 | A | 11/1999 | Burns et al. | 370/429 |
| 5,996,076 | A | 11/1999 | Rowney et al. | 713/201 |
| 5,999,536 | A | 12/1999 | Kawafuji et al. | 370/401 |
| 6,003,077 | A | 12/1999 | Bawden et al. | 709/223 |
| 6,005,851 | A | 12/1999 | Craddock et al. | 370/329 |
| 6,006,264 | A | 12/1999 | Colby et al. | 709/226 |
| 6,009,103 | A | 12/1999 | Woundy | 370/401 |
| 6,012,088 | A | 1/2000 | Li et al. | 709/219 |
| 6,013,107 | A | 1/2000 | Blackshear et al. | 703/229 |
| 6,014,545 | A | 1/2000 | Wu et al. | 455/3.1 |
| 6,018,767 | A | 1/2000 | Fijolek et al. | 709/218 |
| 6,031,841 | A | 2/2000 | Woundy | 370/410 |
| 6,032,019 | A | 2/2000 | Chen et al. | 455/5.1 |
| 6,041,041 | A | 3/2000 | Ramanathan et al. | 370/241 |
| 6,046,979 | A | 4/2000 | Bauman | 370/229 |
| 6,049,546 | A | 4/2000 | Ramakrishnan | 370/412 |
| 6,049,825 | A | 4/2000 | Yamamoto | 709/221 |
| 6,049,826 | A | 4/2000 | Beser | 709/222 |
| 6,052,724 | A | 4/2000 | Willie et al. | 709/223 |
| 6,058,421 | A | 5/2000 | Fijolek et al. | 709/225 |
| 6,061,349 | A | 5/2000 | Coile et al. | 370/389 |
| 6,064,372 | A | 5/2000 | Kahkoska | 345/173 |
| 6,065,049 | A | 5/2000 | Beser | 709/218 |
| 6,070,187 | A | 5/2000 | Subramaniam et al. | 709/220 |
| 6,070,242 | A | 5/2000 | Wong et al. | 713/201 |
| 6,070,246 | A | 5/2000 | Beser | 713/201 |
| 6,073,178 | A | 6/2000 | Wong et al. | 709/229 |
| 6,075,787 | A | 6/2000 | Bobeck et al. | 370/395 |
| 6,091,709 | A | 7/2000 | Harrison et al. | 370/235 |
| 6,094,431 | A | 7/2000 | Yamato et al. | 370/395 |
| 6,104,700 | A | 8/2000 | Haddock et al. | 370/235 |
| 6,112,258 | A | 8/2000 | Miller et al. | 710/19 |
| 6,122,254 | A | 9/2000 | Aydemir et al. | 370/235 |
| 6,128,298 | A | 10/2000 | Wootton et al. | 370/392 |
| 6,130,879 | A | 10/2000 | Liu | 370/230 |
| 6,130,880 | A | 10/2000 | Naudus et al. | 370/235 |
| 6,137,792 | A | 10/2000 | Jonas et al. | 370/354 |
| 6,137,793 | A | 10/2000 | Gorman et al. | 370/360 |
| 6,148,410 | A | 11/2000 | Baskey et al. | 714/4 |
| 6,157,965 | A | 12/2000 | Mohammed et al. | 710/8 |
| 6,170,061 | B1 | 1/2001 | Beser | 713/201 |
| 6,178,455 | B1 | 1/2001 | Schutte et al. | 709/228 |
| 6,185,624 | B1 | 2/2001 | Fijolek et al. | 709/239 |
| 6,189,102 | B1 | 2/2001 | Beser | 713/201 |
| 6,208,656 | B1 | 3/2001 | Hrastar | 370/401 |
| 6,212,563 | B1 | 4/2001 | Beser | 709/227 |
| 6,216,171 | B1 | 4/2001 | Isono et al. | 709/250 |
| 6,223,222 | B1 | 4/2001 | Fijolek et al. | 709/227 |
| 6,230,326 | B1 | * | 5/2001 | Unger et al. | 725/111 |
| 6,240,464 | B1 | 5/2001 | Fijolek et al. | 709/250 |
| 6,243,369 | B1 | 6/2001 | Grimwood et al. | 370/335 |
| 6,260,072 | B1 | 7/2001 | Rodriguez-Moral | 709/241 |
| 6,269,099 | B1 | 7/2001 | Borella et al. | 370/389 |
| 6,272,150 | B1 | 8/2001 | Hrastar et al. | 370/486 |
| 6,275,853 | B1 | 8/2001 | Beser et al. | 709/223 |
| 6,289,377 | B1 | 9/2001 | Lalwaney et al. | 709/222 |
| 6,295,554 | B1 | 9/2001 | Karadogan | 709/219 |
| 6,331,987 | B1 | 12/2001 | Beser | 370/486 |
| 6,332,163 | B1 | 12/2001 | Bowman-Amuah | 709/231 |
| 6,337,858 | B1 | 1/2002 | Petty et al. | 370/356 |
| 6,393,478 | B1 | 5/2002 | Bahlmann | 709/224 |
| 6,442,158 | B1 | 8/2002 | Beser | 370/352 |
| 6,449,291 | B1 | 9/2002 | Burns et al. | 370/516 |
| 6,453,472 | B1 | * | 9/2002 | Leano et al. | 725/111 |
| 6,490,727 | B1 | 12/2002 | Nazarathy et al. | 725/129 |
| 6,507,592 | B1 | * | 1/2003 | Hurvig et al. | 370/503 |
| 6,510,162 | B1 | 1/2003 | Fijolek et al. | 370/432 |
| 6,526,070 | B1 | * | 2/2003 | Bernath et al. | 370/509 |
| 6,594,305 | B1 | * | 7/2003 | Roeck et al. | 375/222 |
| 6,650,624 | B1 | * | 11/2003 | Quigley et al. | 370/252 |
| 6,735,221 | B1 | * | 5/2004 | Cherubini | 370/485 |
| 6,741,551 | B1 | * | 5/2004 | Cherubini | 370/210 |
| 6,742,186 | B1 | * | 5/2004 | Roeck | 725/111 |
| 2002/0122050 | A1 | 9/2002 | Sandberg | 345/705 |
| 2002/0136165 | A1 | 9/2002 | Ady et al. | 370/241 |
| 2003/0028891 | A1 | 2/2003 | Hardt et al. | 725/107 |

OTHER PUBLICATIONS

"Security System Specification (Interim Specification) SP–SSI–101–970506", MCNS Holdings, L.P., 1997, pp. ii to 103.

"Cable Modem to Customer Premise Equipment Interface Specification (Interim) SP–CMCI–102–980317", Multimedia Cable Network Systems (MCNS) Holdings, L.P., Cable Television Laboratories, Inc., 1998, pp. ii to 40.

"Operations Support System Interface Specification Baseline Privacy Interface MIB (Interim Specification) SP–OSSI–BPI–I01–980331", MCNS Holdings, L.P., 1997 and 1998, pp. ii to 33.

"Cable Modern Termination System–Network Side Interface Specification (Interim Specification) SP–CMTS–NSII01–960702", MCNS Holdings, L.P., 1996, pp. ii to 13.

"Removable Security Module Interface Specification (Interim Specification) SP–RSMI–I01–980204", MCNS Holdings, L.P., Cable Television Laboratories, Inc., 1997, pp. ii to 47.

"Operations Support System Interface Specification (Interim) SP–OSSII01–970403", MCNS Holdings, L.P., 1997, pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., Cable Television Laboratories, Inc., 1997, pp. ii to 73.

"Internet Engineering Task Force", Request for Comments 2131, Dynamic Host Configuration Protocol (DHCP), Mar. 1997, pp. 1 to 42.

Kyees, P.J. et al., ADSL: A New Twisted–Pair Access to the Information Highway, IEEE Communications Magazine, vol. 33, Issue 4, Apr. 1995, pp. 52–60.

Huang, Yin–Hwa et al., Design of an MPEG–Based Set–Top Box for Video on Demand Services, Acoustics, Speech, and Signal Processing, 1995, ICASSP–95., 1995 International Conference, vol. 4, ISBN: 0–7803–2431–5, May 9–12, 1995, pp. 2655–2658.

"Internet Engineering Task Force", Request for Comments 768, User Datagram Protocol, Aug. 1980, pp. 1 to 3.

"Internet Engineering Task Force", Request for Comments 791, Internet Protocol, Sep. 1981, pp. i to 45.

"Internet Engineering Task Force", Request for Comments 792, Internet Control Message Protocol, Sep. 1981, pp. 1 to 21.

"Internet Engineering Task Force", Request for Comments 1157, A Simple Network Management Protocol (SNMP), May 1990, pp. 1 to 36.

"Internet Engineering Task Force", Request for Comments 1350, The TFTP Protocol (Revision 2), Jul. 1992, pp. 1 to 11.

S. Adiraju, J. Fijolek, IPCDN Telephony Return MIB, Internet Engineering Task Force, Internet Draft, " <draft–ietf–ipcdn–tri–mib–00.1.txt>," Mar. 1998, pp. 1 to 26.

"A Solution for the Priority Queue Problem of Deadline–Ordered Service Disciplines," N.R. Figueria, IEEE International Conference on Computer Communications and Networks, Sep. 22–25, 1997, pp. 320–325.

"Radio Frequency Interface Specification (Interim Specification) SP–RFI–I04–980724", MCNS Holdings, L.P., 1997, pp. ii to 196.

Droms, R., *Dynamic Host Configuration Protocol*, Request for Comments 1541, Oct. 1993, pp. 1 to 31.

RFC 791, *Internet Protocol, DARPA Internet Program Protocol Specification*, Sep. 1981, pp. 1–37.

Postel, J., *Internet Protocol, DARPA Internet Program Protocol Specification*, RFC 792, Sep. 1981, pp. 1–14.

Postel, J., *User Datagram Protocol*, RFC 768, Aug. 28, 1980, pp. 1–3.

RFC 793, *Transmission Control Protocol, DARPA Internet Program Protocol Specification*, Sep. 1981, pp. 1–68.

Case, J. et al., *A Simple Network Management Protocol (SNMP)*, RFC 1157, May 1990, pp. 1–26.

Sollins, K., *The TFTP Protocol (Revision 2)*, RFC 1350, Jul. 1992, pp. 1–9.

Alexander, S., *DHCP Options and BOOTP Vendor Extensions*, RFC 2132, Mar. 1997, pp. 1–37.

"Radio Frequency Interface Specification (Interim Specification) SP–RFIv1.1–I03–991105", MCNS Holdings, L.P., 1999, pp. Ii to 366.

* cited by examiner

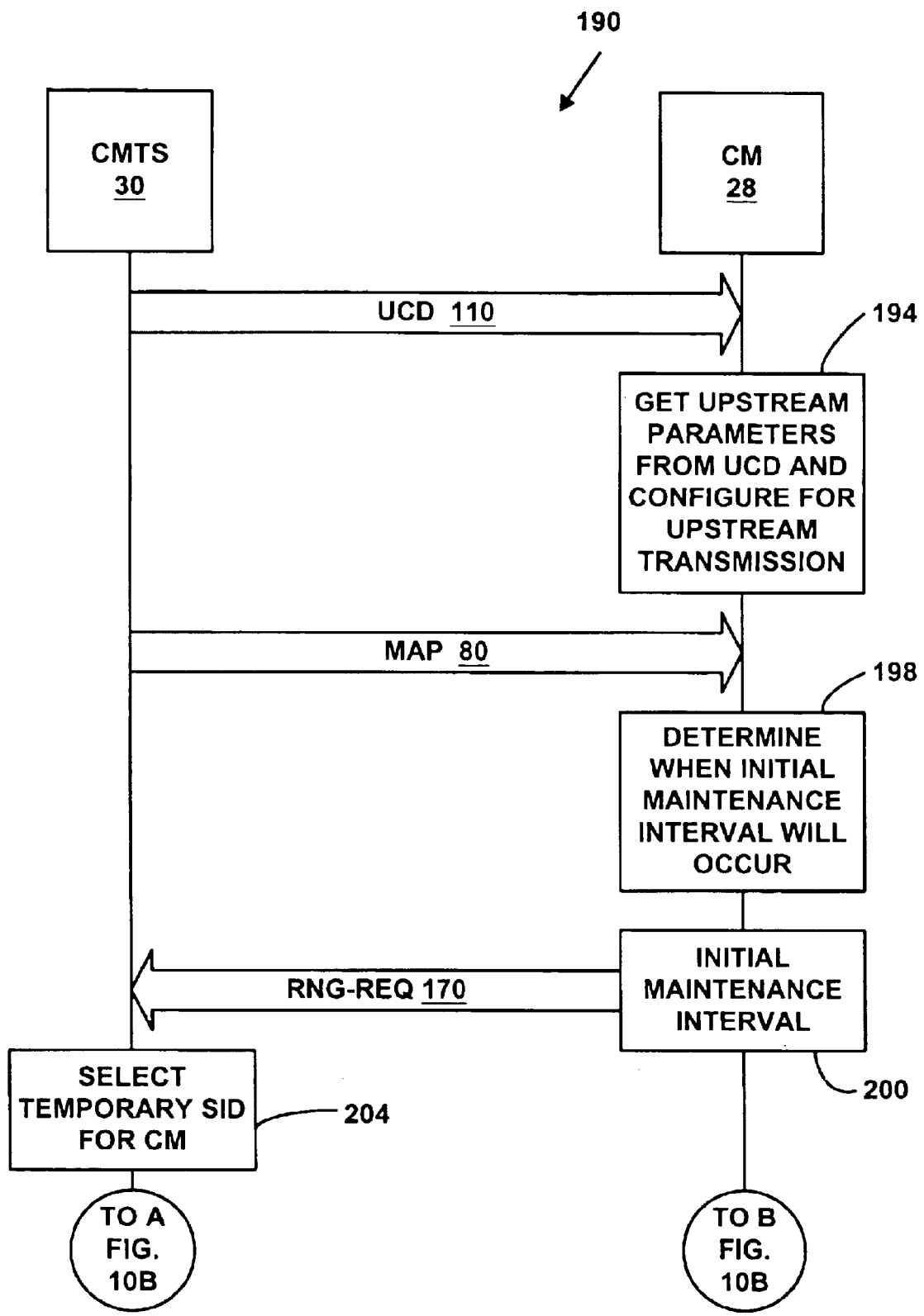

METHOD FOR REDUCING INTERFERENCE FROM INITIALIZING NETWORK DEVICES IN A DATA-OVER-CABLE SYSTEM

FIELD OF INVENTION

The present invention relates to communication networks. More specifically, it relates to a method for reducing interference from initializing network devices in a data-over-cable system.

BACKGROUND OF THE INVENTION

With the explosive growth of the Internet, many customers have desired to use the larger bandwidth of a cable television network to connect to the Internet and other computer networks. Cable modems, such as those provided by 3Com Corporation of Santa Clara, Calif., and others offer customers higher-speed connectivity to the Internet, an intranet, local area networks ("LANs") and other computer networks via cable television networks. These cable modems currently support a data connection to the Internet and other computer networks via a cable television network with a data rate of up to 30+ Mbps which is a much larger data rate than can be supported by a modem used over a standard telephone line.

The physical plant of the data-over-cable system may be divided into physically isolated branches that distribute digital signals from a cable modem termination system ("CMTS") to geographically distinct groups of cable modems. Typically, each branch carries the same downstream signal that serves all the cable modems, regardless of which branch they are on. By contrast, in the reverse or upstream direction, the cable modems on any given branch transmit to the CMTS with a set of common transmission parameters, which may differ from the upstream transmission parameters for another branch. Thus the transmissions to the CMTS on each branch are independent of the transmissions on the other branches. Typically, the transmissions on different branches do not interfere with each other because the branches are physically isolated from each other.

When a cable modem is connected to a data-over-cable system, it must first gain access to the system by undergoing an initialization procedure before it is permitted to transmit data. A part of the initialization procedure includes a ranging process to determine the appropriate transmission parameters for its data transfer. This process involves sending a ranging message at an appropriate time interval, referred to as the Initial Maintenance interval.

In data-over-cable systems with more than one branch, the Initial Maintenance intervals for ranging on each branch are typically independent of each other. Unfortunately, this independence may cause ranging messages from one branch to interfere with upstream data transmissions on another branch. This interference occurs because an initializing cable modem may not have sufficient information to identify to which branch it belongs. In the most typical arrangement of cable modem transmission parameters, the cable modems on each branch transmit upstream at a common transmission frequency. The common upstream transmission frequency usually does not present a problem since the branches are physically isolated. When a cable modem initializes, however, it examines the downstream transmissions and determines when an Initial Maintenance interval is scheduled to occur. The problem is that the cable modem may accept the Initial Maintenance interval for another branch and thus send out ranging messages at the wrong time for its branch.

These mistimed ranging messages generally interfere with legitimate upstream data transmissions from the other cable modems on the branch. One solution to this problem is to arrange that the upstream transmission frequency for each branch is different. The CMTS is tuned to receive signals from each branch at the frequency appropriate for that branch. Then incorrect ranging signals are at a different frequency from the legitimate data transmissions, do not interfere with the data transmissions, and are rejected by the CMTS. In practice, however, the limited bandwidth for upstream radio frequency propagation does not permit sufficient number of branches to be tuned to different frequencies.

It is, therefore, desirable to reduce interference between ranging messages from initializing network devices on branches of a data-over-cable system and upstream data transmissions.

SUMMARY OF THE INVENTION

One aspect of the invention is a method for reducing interference from initializing network devices. The method includes aligning multiple maintenance intervals. Each of the maintenance intervals is associated with an upstream channel. The initializing network devices are instructed to range during the aligned maintenance intervals.

Another aspect of the invention is a method for aligning the multiple maintenance intervals. The method includes determining a measure of common maintenance start time for the multiple maintenance intervals. A CMTS decides whether the measure of common maintenance start time falls within multiple usage intervals. Each of the multiple usage intervals is associated with an upstream channel. When the measure of common maintenance start time falls within the multiple usage intervals, the CMTS schedules the maintenance intervals to start at the measure of common maintenance start time.

Another aspect of the invention is also a method for aligning the multiple maintenance intervals. The method includes determining a measure of common maintenance start time for the multiple maintenance intervals. The CMTS identifies a longest maintenance interval from the multiple maintenance intervals and calculates a number of maintenance intervals that can occur during the longest maintenance interval for each upstream channel. The CMTS decides whether the measure of common maintenance start time falls within multiple usage intervals. Each of the multiple usage intervals is associated with an upstream channel. When the measure of common maintenance start time falls within the multiple usage intervals, for each upstream channel of the plurality of upstream channels, the CMTS schedules the number of maintenance intervals to start at the measure of common maintenance start time.

BRIEF DESCRIPTION OF THE DRAWINGS

The foregoing and other features and advantages of preferred embodiments of the present invention will be more readily apparent from the following detailed description, which proceeds with references to the accompanying drawings in which:

FIGS. 10A and 10B are a block diagram illustrating a message flow during cable modem initialization in the data-over-cable system depicted in FIG. 1;

DETAILED DESCRIPTION OF PREFERRED EMBODIMENTS

The Internet, a world wide network of interconnected computers, provides multi-media content including audio, video, graphics, and text that customers may best experience over data connections to the Internet that have large bandwidths. But most Internet Service Providers ("ISPs") typically allow customers to connect to the Internet via an analog serial telephone line from a public switched telephone network at data rates including 14,400 bps, 28,800 bps, 33,600 bps, 56,000 bps, and others, which many customers find to be too slow. Therefore, customers are increasingly turning to other ways of connecting to the Internet that may provide data rates well in excess of those provided by analog telephone lines.

One type of high bandwidth data connection is available from a cable television network. The cable television network can provide data services having data rates from about 10 Mega-bits-per-second ("Mbps") to 30+ Mbps per channel. Apart from having the advantage of already being installed in most metropolitan areas, the cable television network also serves a large number of subscribers over a large geographical area through a network of coaxial cables or Hybrid Fiber/Coaxial ("HFC") cables. Cable television networks include those provided by Comcast Cable Communications, Inc., of Philadelphia, Pa., Cox Communications of Atlanta, Ga., AT&T Corporation of New York, N.Y., Time-Warner Cable, of Marietta, Ga., Continental Cablevision, Inc., of Boston, Mass., among others. Data-over-cable systems, also known to those skilled in the art as cable modem systems, typically use the cable television network already in existence in the geographical area.

Background information related to cable modem systems in general is described in the Data-Over-Cable Service Interface Specifications ("DOCSIS")—Radio Frequency Interface Specifications, Interim Draft, dated Nov. 5, 1999, issued by Cable Television Laboratories, Inc. This document, known to persons working in the art, is incorporated by reference herein.

Figure 1:
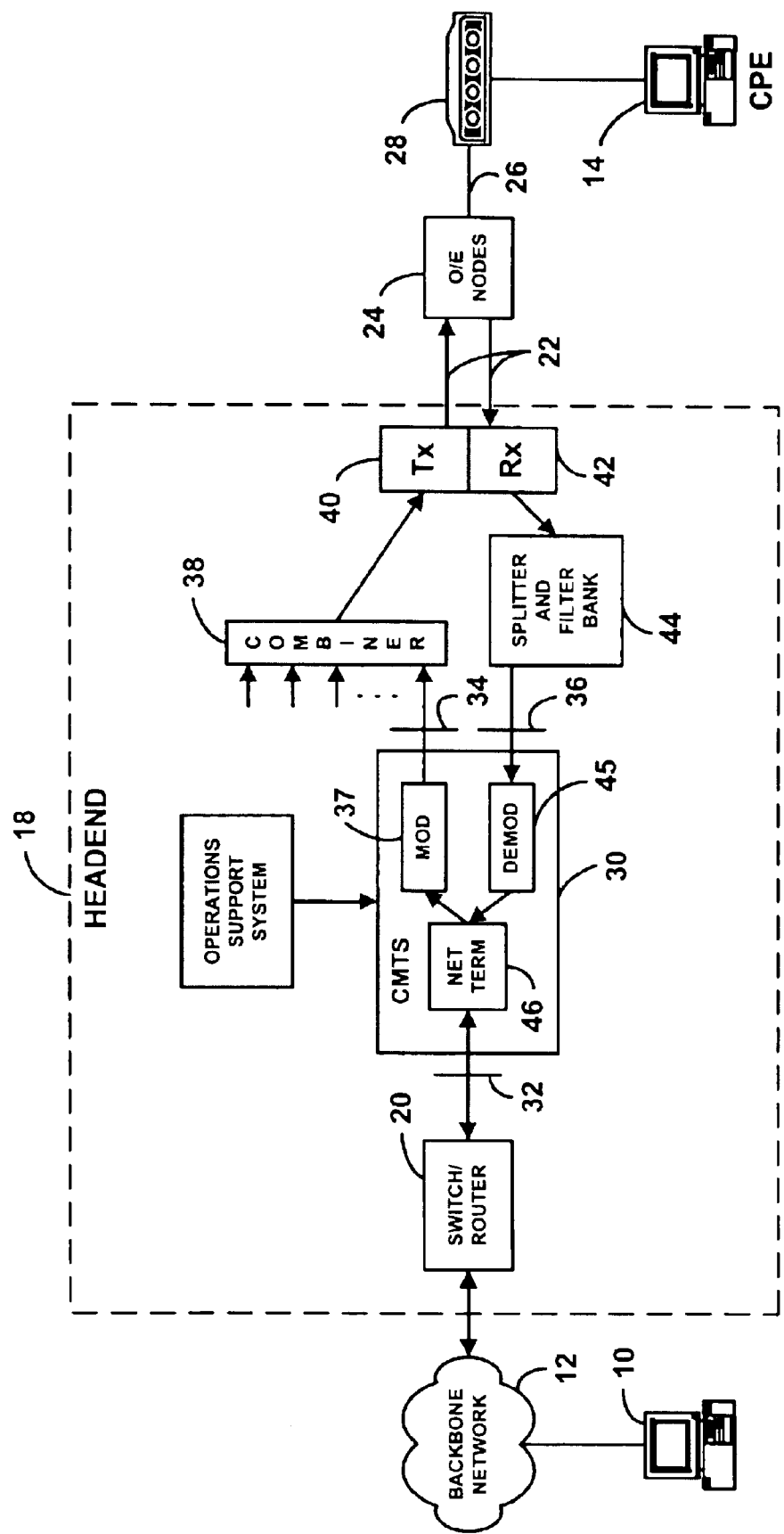
FIG. 1 is a block diagram illustrating a basic architecture for a data-over-cable system.

FIG. 1 is a block diagram illustrating the basic overall architecture of a data-over-cable system. The system of FIG. 1 provides a mechanism by which a computer 10 connected, either directly or indirectly by intermediate networks, to a backbone network 12, may communicate with another computer 14 via a data-over-cable infrastructure indicated generally by reference numeral 16. The cable television infrastructure 16 includes a distribution hub or "head-end" 18 that is connected to the backbone network 12 via a switch or router 20. The cable system head-end 18 is typically a central location in the cable television network that is responsible for sending cable signals in the downstream direction as defined below. The head-end 18 modulates digital data from the backbone network 12 into analog form and supplies the analog signals to a fiber network 22, which is connected to a plurality of optical/electronic ("O/E") nodes 24. The O/E nodes 24 convert optical signals in the fiber network 22 to electrical signals for transmission over a coaxial cable network 26 to a cable modem 28 at the customer's location. The cable modem ("CM") 28 demodulates the analog signals, extracts the digital data, and supplies the data to the customer premise equipment ("CPE") 14. The CPE 14, in a typical situation, is a general purpose computer, but may alternatively be a multimedia display device or a point-of-sale terminal.

The head-end 18 includes a cable modem termination system ("CMTS") 30. The CMTS 30 provides a network side interface to a wide area network, indicated at 32, and a radio frequency ("RF") interface between the CMTS 30 and the cable network in both the downstream and upstream directions, indicated respectively at 34 and 36. As used in the present document, the term "downstream" refers to transmission in the direction from the head-end 18 or CMTS 30 to the cable modem 28 at the customer premises. The term "upstream" refers to transmission in the direction from the cable modem 28 to the CMTS 30.

For transmission in the downstream direction, the CMTS 30 supplies data received from the computer 10 through the network 12 to a modulation circuit ("MOD") 37 and then to a combiner 38, which combines the data with video signals for the cable television system. The combined signals are sent to a transmission module 40 where they are imparted onto the fiber network 22. The O/E nodes 24 convert the signals from the fiber network 22 to electrical signals on the coaxial cable network 26. Together, the fiber network 22, O/E nodes 24, and coaxial cable network 26 are often referred to in the art as a Hybrid Fiber Cable ("HFC") network.

In a typical two-way cable system, also termed a bi-directional cable system, a cable modem 28 will transmit data packets to the CMTS 30 over one or more upstream channels on the cable television network 22 and 26. In the upstream direction, data from the cable modem 28 transmits data from the CPE 14 over the cable network 26 and 22, which is received at a receiver module 42. The receiver module 42 couples the upstream signal to a splitter and filter bank 44 which separates the data signal from video signals for the cable television system and couples the data signal to a demodulation circuit ("DEMOD") 45 in the CMTS 30. A network termination unit 46 processes the data, sends the data to the switch or router 20, and routes the data onto the network 12 for transmission to the remote computer 10.

A data packet may carry, as its payload, information that is sent from the CPE 14 and destined for the CMTS 30. The cable modem 28 adds overhead to the data packet to maintain the integrity of the payload. Examples of overhead include redundant bits for error correction and preambles. On the cable network 22 and 26 side of the cable modem 28, the cable modem 28 transmits from and receives the data packet and overhead in the form of digitally modulated radio frequency carriers. An exemplary bi-directional data-over-cable system includes customer premises equipment 14 (e.g., a customer computer), a cable modem 28, a CMTS 30, a cable television network 18, 22, 26, and a backbone data network 12 (e.g., the Internet).

The preferred embodiments may be utilized with a bi-directional cable system. Cable modems and cable modem termination systems include those provided by 3Com Corporation of Santa Clara, Calif., Motorola Corporation of Schamburg, Ill., Bay Networks of Santa Clara, Calif., Scientific-Atlanta of Norcross, Ga., and others.

Cable Modem Protocol Stack

Figure 2:
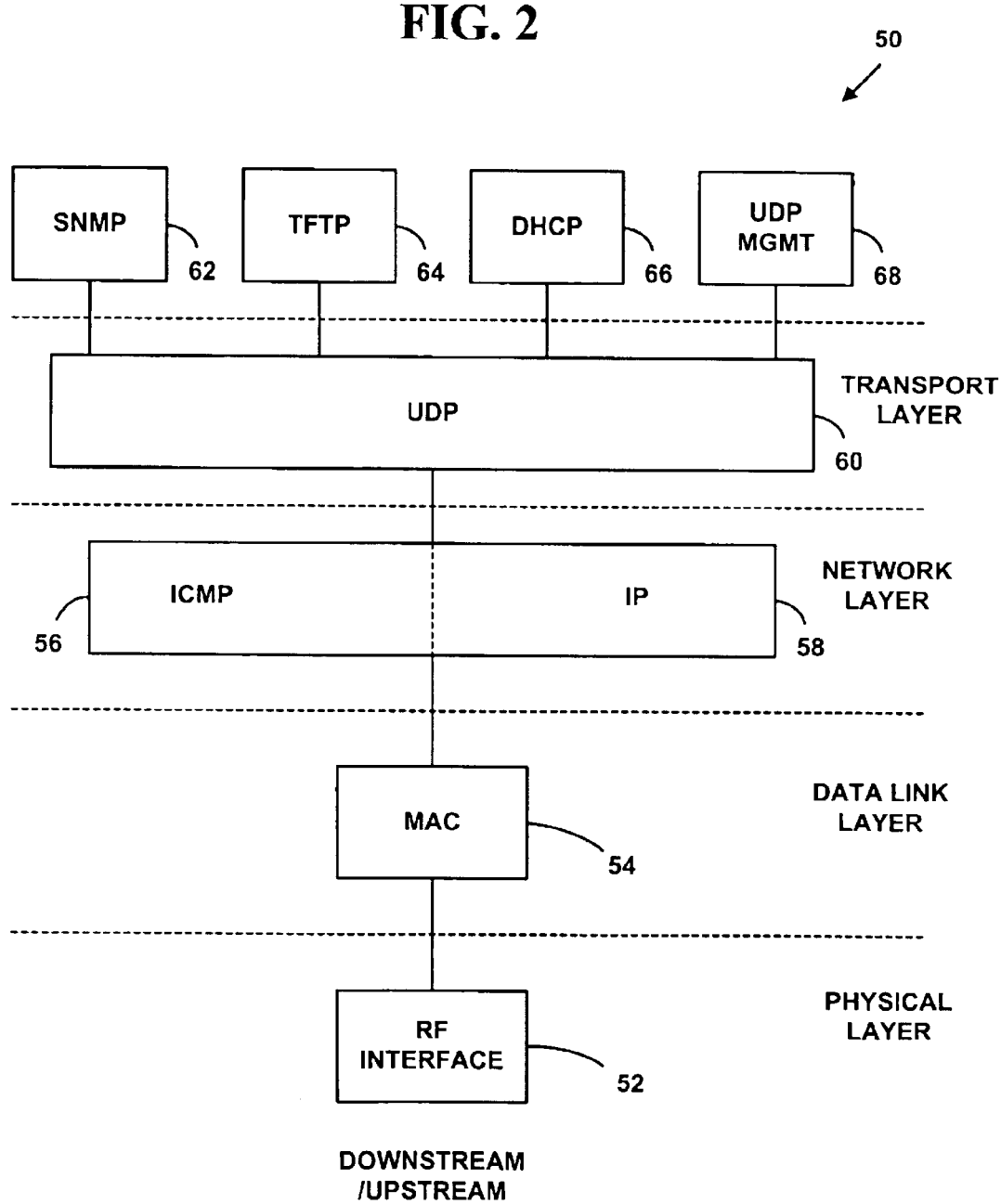
FIG. 2 is a block diagram illustrating a protocol stack for a cable modem in the data-over-cable system depicted in FIG. 1.

FIG. 2 is a block diagram illustrating a protocol stack 50 for the cable modem 28. FIG. 2 illustrates the downstream and upstream protocols used in the cable modem 28. As is known in the art, the Open System Interconnection ("OSI") model may be used to describe computer networks. The OSI model consists of seven layers including, from lowest-to-highest, a physical, data-link, network, transport, session, presentation and application layer. The network layer places routing information into the data packets. The data link layer transmits data packets. The physical layer transmits the data packets and overhead as bits over a communication link.

For data transmission over a bi-directional data-over-cable system, the cable modem 28 connects to the cable network 26 in a physical layer via a radio frequency ("RF") interface 52. In an exemplary preferred embodiment of the present invention, the RF interface 52 has an operation frequency range of approximately 50 Mega-Hertz ("MHz") to 1 Giga-Hertz ("GHz") and a channel bandwidth of approximately 6 MHz on the downstream channels. In another exemplary preferred embodiment of the present invention, which relates to a bi-directional data-over-cable system, the RF interface 52 has an operation frequency range of approximately 5 MHz to 42 MHz on the upstream channels. Information on such interfaces may be found in DOCSIS. However, other operation frequencies and bandwidths may also be used and the invention is not limited to these frequencies and bandwidths.

The RF interface 52 preferably uses a signal modulation method of Quadrature Amplitude Modulation ("QAM"), although other methods may alternatively be used. As is known in the art, QAM is used as a means of encoding and decoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels.

In one embodiment of the present invention, the RF interface 52 uses QAM-64 for downstream reception. In another embodiment of the present invention, upstream transmission uses QAM-16 or Quadrature Phase-Shift-Keying ("QPSK"). For the upstream embodiment, the symbol rate of upstream transmission may be 160, 320, 640, 1,280, or 2,560 kilo-symbols per second ("ksym/sec") for 16-QAM, or 160, 320, 640, 1,280, or 2,560 ksym/sec for QPSK. However, other operating frequencies, modulation methods, and symbol rates may alternatively be used. Also, other RF interfaces 52 may be used and the present invention is not limited to interfaces complying with DOCSIS.

Referring again to FIG. 2, above the RF interface 52 in a data-link layer is a Medium Access Control ("MAC") layer 54. As is known in the art, the MAC layer 54 controls access to a transmission medium via the physical layer. Information on the MAC layer protocol 54 may be found in DOCSIS. However, other MAC layer 54 protocols may alternatively be used and the preferred embodiments are not limited to MAC layer protocols as described in DOCSIS.

Above both the downstream and upstream data-link layers in a network layer is an Internet Protocol ("IP") layer 58. The IP layer 58, hereinafter IP 58, roughly corresponds to OSI layer 3, the network layer, but is typically not defined as part of the OSI model. As is known in the art, the IP 58 is a routing protocol designed to route traffic within a network or between networks. Additional information on the IP 58 may be found in the Internet Engineering Task Force ("IETF") standard Request For Comments ("RFC") 791—Internet Protocol, dated September 1981, which is incorporated herein by reference.

Also within the network layer of the protocol stack 50, an Internet Control Message Protocol ("ICMP") layer 56 is used for network management. The main functions of the ICMP layer 56, hereinafter ICMP 56, include error reporting, reachability testing (e.g., "pinging"), congestion control, route-change notification, performance, and subnet addressing. Since the IP 58 is an unacknowledged protocol, datagrams may be discarded and the ICMP 56 is used for error reporting. Additional information on the ICMP 56 may be found in IETF standard RFC 792—Internet Control Message Protocol, dated September 1981, which is incorporated herein by reference.

Above the IP 58 and the ICMP 56 is a transport layer with a User Datagram Protocol ("UDP") layer 60. The UDP layer 60, hereinafter UDP 60, roughly corresponds to OSI layer 4, the transport layer, but is typically not defined as part of the OSI model. As is known in the art, the UDP 60 provides a connectionless mode of communication with datagrams. Additional information on the UDP 60 may be found in IETF standard RFC 768—User Datagram Protocol, dated Aug. 28, 1980, which is incorporated herein by reference.

Above the network layer are a Simple Network Management Protocol ("SNMP") layer 62, a Trivial File Transfer Protocol ("TFTP") layer 64, a Dynamic Host Configuration Protocol ("DHCP") layer 66 and a UDP manager 68. The SNMP layer 62 is used to support network management functions. Additional information on the SNMP layer 62 may be found in IETF standard RFC 1157—A Simple Network Management Protocol (SNMP), dated May 1990, which is incorporated herein by reference. The TFTP layer 64 is a file transfer protocol used to download files and configuration information. Additional information on the TFTP layer 64 may be found in IETF standard RFC 1350—The TFTP Protocol (Revision 2), dated July 1992, which is incorporated herein by reference. The DHCP layer 66 is a protocol for passing configuration information to hosts on an IP 54 network. Additional information on the DHCP layer 66 may be found in IETF standard RFC 2131—Dynamic Host Configuration Protocol, dated March 1997, which is incorporated herein by reference. The UDP manager 68 distinguishes and routes packets to an appropriate service such as a virtual tunnel known to those skilled in the art. More or fewer protocol layers may also be used with a data-over-cable system 16.

An operating environment for the CMTS 30, cable modems 28, and other network devices of the present invention includes a processing system with at least one Central Processing Unit ("CPU") and a memory system.

Preferably, a CPU controls the operations of the CMTS 30. In accordance with the practices of persons skilled in the art of computer programming, the preferred methods are described herein with reference to acts and symbolic representations of operations that are performed by the processing system, unless indicated otherwise.

It will be appreciated that the acts and symbolically represented operations include the manipulation of electrical signals by the CPU. The electrical signals represent data bits that cause a resulting transformation or reduction of the electrical signal representation. The CMTS 30, cable modems 28, and other network devices may maintain data bits at memory locations in their respective memory systems to reconfigure or otherwise alter their CPU's operation, as well as other processing of signals. The memory locations, such as random access memory ("RAM"), are physical locations that have particular electrical, magnetic, or optical properties corresponding to the data bits, depending on the type of memory used.

The data bits may also be maintained on a computer readable medium including magnetic disks, optical disks, organic disks, and any other volatile or non-volatile mass storage system readable by the CPU. The computer readable medium includes cooperating or interconnected computer readable media that exist exclusively on the processing system or are distributed among multiple interconnected processing systems that may be local or remote to the processing system.

Upstream Data Transmission

A cable modem 28 typically transmits on an upstream channel during a transmission mini-slot allocated by the CMTS 30. The upstream channel may be viewed as time-divided into a stream of mini-slots, each of which is a unit of granularity for upstream transmission opportunities. The CMTS 30 also times the mini-slots to prevent collisions between the transmissions from different cable modems by instructing the cable modems 28 to transmit alternately during the mini-slots.

Figure 3:
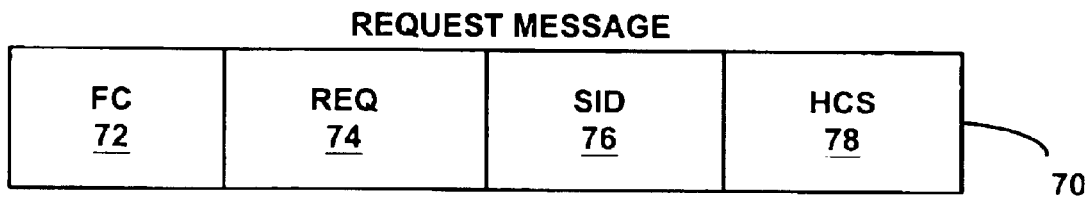
FIG. 3 is a block diagram illustrating a structure of a Request message that may be transmitted by a cable modem in the data-over-cable system of FIG. 1.

Before transmitting data, however, a cable modem 28 must first request permission to transmit from the CMTS 30. A cable modem 28 that wishes to transmit sends a Request message to the CMTS 30. FIG. 3 is a diagram illustrating a preferred structure of a Request message 70. The Request message 70 includes a frame control field 72 ("FC"), a bandwidth request field 74 ("REQ"), a service identifier field 76 ("SID"), and a MAC header check sequence field 78 ("HCS"). Descriptions for the Request message 70 fields are shown in Table 1.

TABLE 1

| Request message 70 Parameter | Description |
| --- | --- |
| FC 72 | Frame control. Identifies type of MAC message. |
| REQ 74 | Total amount of bandwidth requested in mini-slots. |
| SID 76 | Service Identifier for the cable modem 28 that sent the REQ message. |
| HCS 78 | MAC header check sequence. |

The SID 76 is a unique identifier for the cable modem 28 that is requesting permission to transmit. The SID 76 may be assigned by the CMTS 30 when the cable modem 28 initializes and registers with the CMTS 30 as discussed below. The REQ 74 field contains a measure of how much bandwidth, i.e. how many mini-slots, the cable modem 28 requests for the transmission of its data to the CMTS 30.

In response, the CMTS 30 builds an Upstream Bandwidth Allocation Map message 80 ("MAP") and transmits it via the downstream channel to all cable modems 28. Typically, the CMTS 30 receives requests from a number of cable modems 28 that wish to transmit and may allocate one or more transmission mini-slots to each of the cable modems 28. The MAP message 80 then informs each cable modem 28 of its permitted mini-slot(s) for transmission.

Figure 4:
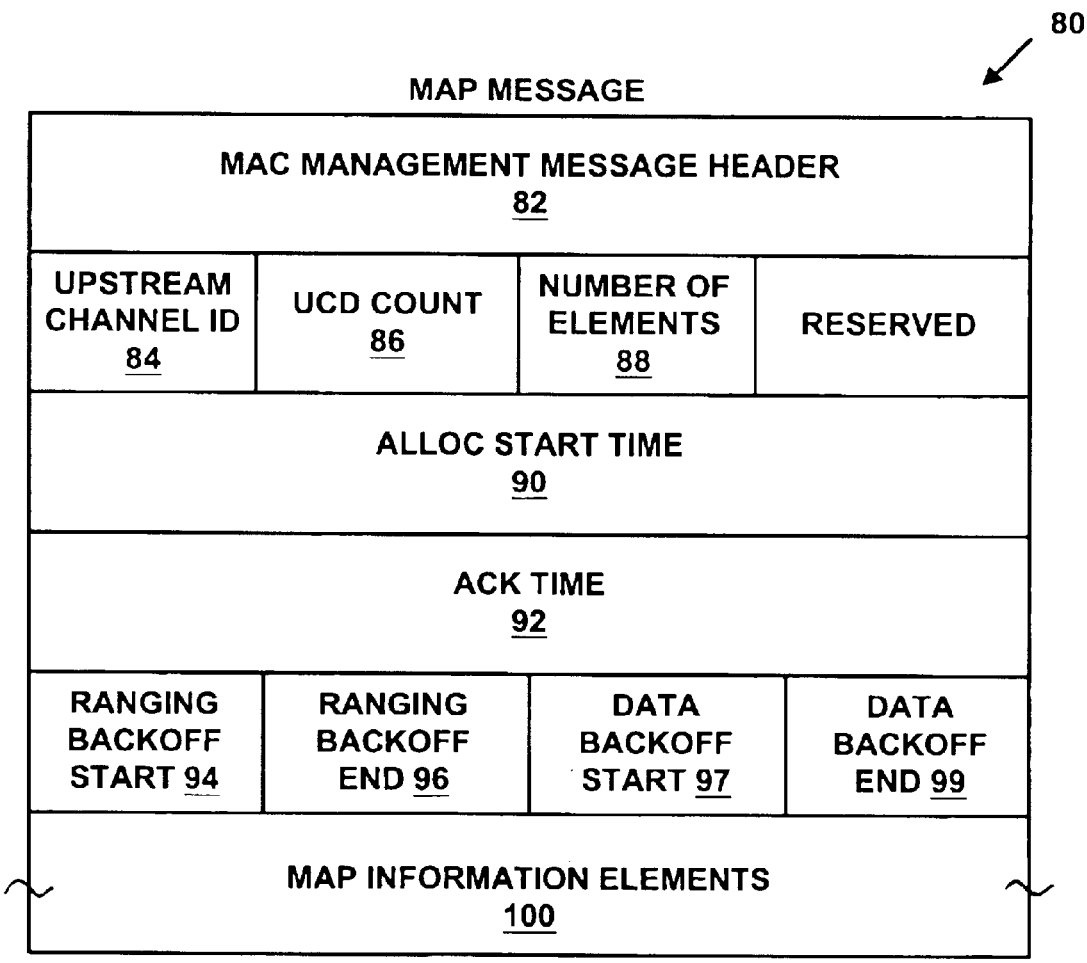
FIG. 4 is a block diagram illustrating the structure of a MAP message transmitted by a CMTS in the data-over-cable system of FIG. 1.

FIG. 4 is a block diagram illustrating the structure of a preferred MAP message 80. The MAP message 80 includes a MAC management header field 82, an upstream channel identifier field 84, an upstream channel descriptor count field 86 ("UCD Count"), a number of elements field 88, a reserved field, an allocation start time field 90 ("Alloc Start Time"), an acknowledgement time field 92 ("Ack Time"), a ranging backoff start field 94, a ranging backoff end field 96, a data backoff start field 97, a data backoff end field 99, and a MAP information elements field 100. Descriptions for the MAP message 80 fields are shown in Table 2.

TABLE 2

| MAP message 80 Parameter | Description |
| --- | --- |
| MAC Management Message Header 84 | The header of this message identifying it as a MAP message. |
| Upstream Channel ID 84 | The identifier of the upstream channel to which this message belongs. |
| UCD Count 86 | Matched the value of the Configuration Change Count of the UCD which describes the burst parameters which apply to this map. |
| Number of Elements 88 | Number of information elements in the map. |
| Alloc Start Time 90 | Effective start time from CMTS 30 initialization (in mini-slots) for assignments within this map. |
| Ack Time 92 | Latest time, from CMTS 30 initialization, (in mini-slots) processed in upstream. |
| Ranging Backoff Start 94 | Initial back-off window for initial ranging contention. |
| Ranging Backoff End 96 | Final back-off window for initial ranging contention. |
| Data Backoff Start | Initial back-off window for contention data and requests. |
| Data Backoff End | Final back-off window for contention data and requests. |
| MAP Information Elements 100 | Encoded data blocks that designate the allocation of transmission mini-slots on the upstream channel. |

The MAP message 80 informs the cable modems 28 of the allocation of mini-slots for a scheduled upstream usage interval and when to begin the usage interval. In a given upstream usage interval, selections of the cable modems 28 alternately transmit on the upstream channel. As is known in the art, each upstream usage interval is composed of transmission intervals, also referred to as "bursts," which comprise at least one mini-slot.

The upstream channel identifier field 84 within the MAP message 80 includes an identifier for the upstream channel to which the MAP message 80 applies. As is known to those of ordinary skill in the art, the data-over-cable system 16 may support upstream transmission on more than one upstream channel. For example, a common head-end 18 may serve more than one branch of the HFC network 22–26, and each branch may require a unique upstream channel for reasons of network configuration. In such a case, the Upstream Channel ID 84 may distinguish between the branches. Thus, the MAP message 80 intended for the cable modems 28 served by one branch may be distinguished from the MAP messages 80 for cable modems 28 on other branches by use of the Upstream Channel ID 84.

Figure 5:
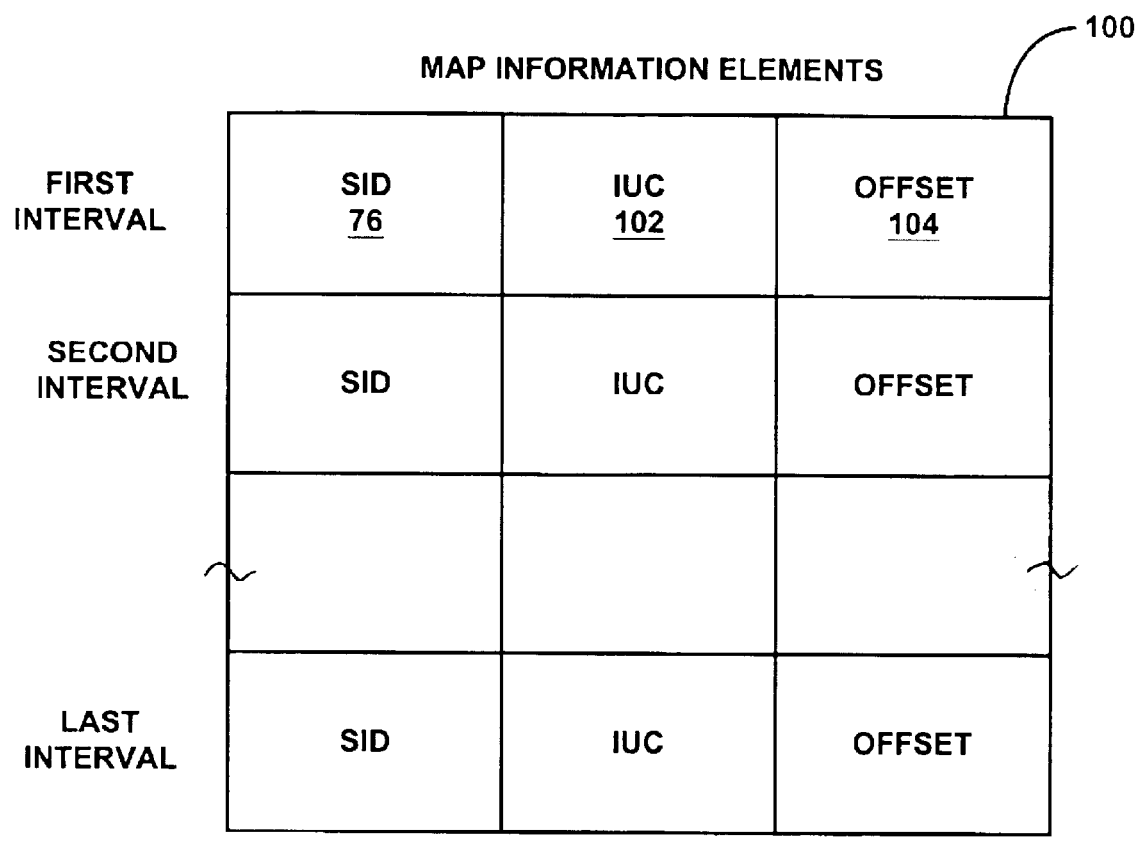
FIG. 5 is a block diagram illustrating the structure of MAP Information Elements that may appear in the MAP message of FIG. 4.

The MAP Information Elements field 100 designates the order and duration of the transmissions from the cable modems 28 for the upstream channel. As described in DOCSIS, one element may describe each transmission. The Number of Elements field 88 contains the total number of such elements. FIG. 5 is a block diagram illustrating a preferred structure of the MAP Information Elements 100. Each interval includes a field for the SID 76 of the cable modem 28 that is permitted to transmit in that interval. The Interval Usage Code field 102 ("IUC") informs the cable modem 28 of the kind of upstream transmission that is permitted in the interval. The offset field 104 specifies when the transmission interval occurs. In this manner, the series of intervals permit the selection of cable modems 28 to deliver their data packets to the CMTS 30 without the transmissions colliding on the upstream path.

The IUCs 102 are values that designate the type of transmission that is permitted in each interval. The cable modems 28 may be capable of several types of transmission. For example, the transmission may be for the purposes of ranging, allowing a cable modem 28 to compensate for delay on the cable network. Additionally, the transmission may be for the purpose of delivering a data packet to the CMTS 30. Two types of data transmissions typically occur: a short data grant or a long data grant. These data grants correspond to IUCs 102 that are described in DOCSIS. For example, a short data grant may be appropriate when the CPE 14 only has a small amount of data to transmit on the upstream channel, such as a few keystrokes or the opening of a hyperlink on a web page. A long data grant may be appropriate when the CPE 14 requests to transfer a file through the backbone network 12. In this manner, the CMTS 30 instructs the cable modem 28 when to transmit, on which upstream channel, and what type of data to transmit.

It should be understood, however, as alternatives to the foregoing, that other field settings for the Request message 70, the MAP message 80, and the MAP Information Elements 100 might be used.

Parameters for Upstream Data Transmission

Additionally, the cable modem 28 may transmit data packets in adjacent mini-slots according to different transmission formats for the RF interface 52. Associated with the formats are parameters for data transmission. In one exemplary preferred embodiment of the present invention, the parameters for upstream data transmission include the symbol rate, the upstream channel frequency, the modulation type, the preamble, and Forward Error Correction ("FEC") parameters as described in Table 3.

TABLE 3

| Parameter for data transmission | Description |
| --- | --- |
| Frequency | Center frequency of upstream channel (Hz). |
| Symbol rate | Multiples of base rate of 160 ksym/sec. |
| Modulation type | QPSK or 16-QAM. |
| Preamble | Training sequence of bits used for automatic gain control and modulation. |
| FEC level (T) | Amount of redundant bytes that are added to correct for errors. |

TABLE 3-continued

| Parameter for data transmission | Description |
| --- | --- |
| FEC data coverage size (k) | Amount of bytes over which error correction is to be performed. |

As is known in the art, FEC adds redundant bits to the data packet to detect, locate, and correct transmission errors. The FEC level ("T") is a measure of the amount of redundant data that must be added to the data packet to allow for error correction; A higher value of T provides a better level of error correction. The FEC data coverage size ("k") is a measure of the amount of information over which data correction is to be performed; For the same FEC level, an increase in the FEC data coverage size will result in more errors going uncorrected. It should be understood that many more data transmission parameters are possible and that the present invention is not restricted to the parameters described herein.

Figure 6:
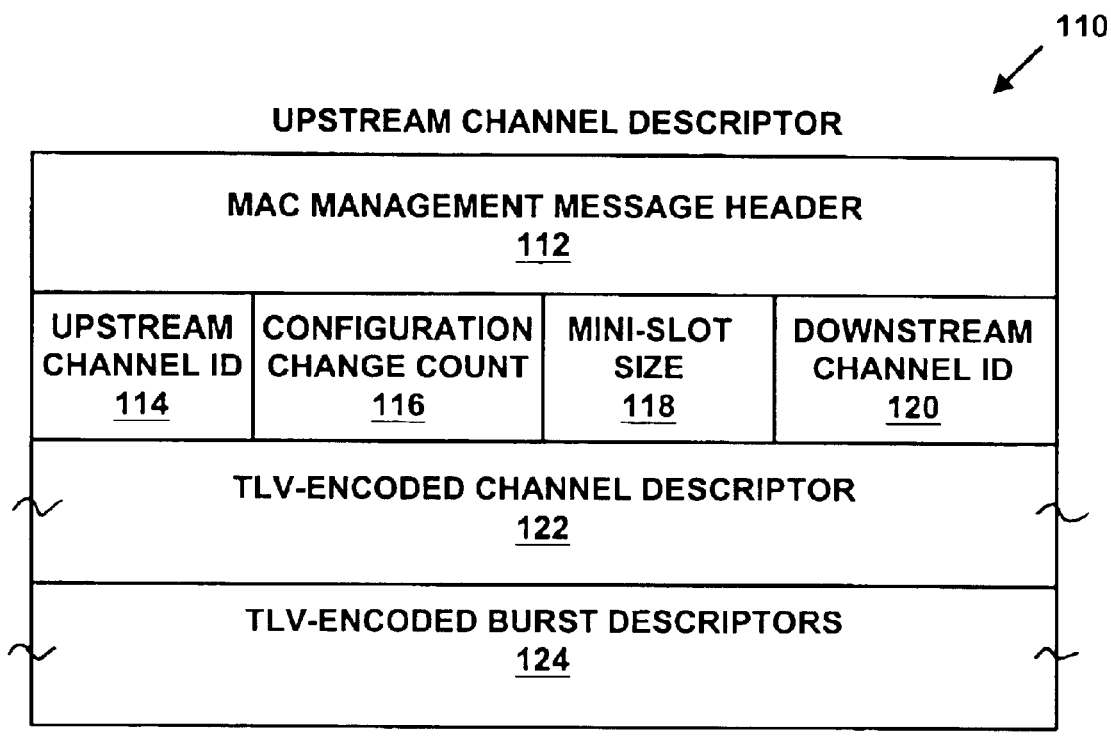
FIG. 6 is a block diagram illustrating the structure of a UCD message transmitted by a CMTS in the data-over-cable system of FIG. 1.

Because each upstream channel may transmit according to a different transmission format, the cable modems 28 may undergo configuration so that their future transmissions occur according to a particular upstream format. The CMTS 30 may configure the cable modems 28, for example, by issuing an Upstream Channel Descriptor ("UCD") message. FIG. 6 is a block diagram illustrating a preferred structure of a UCD message 110. The UCD message 110 includes a MAC Management Message Header field 112, an upstream channel identifier field 114, a configuration change count field 116, a mini-slot size field 118, a downstream channel identifier field 120, a type-length-value ("TLV") encoded channel descriptor field 122, and a TLV encoded burst descriptor field 124. Descriptions for the UCD message 110 fields are shown in Table 4.

TABLE 4

| UCD message 110 Parameter | Description |
| --- | --- |
| MAC Management Message Header 112 | The header of this message identifying it as a UCD message. |
| Upstream Channel ID 114 | The identifier of the upstream channel to which this message belongs. |
| Configuration Change Count 116 | CMTS 30 increments by one whenever any descriptors change. |
| Mini-Slot Size 118 | The duration of a mini-slot. |
| Downstream Channel ID 120 | The identifier of the downstream channel on which this message has been transmitted. |
| TLV Encoded Channel Descriptors 122 | Data blocks which describe the parameters for data transmission to be implemented for the overall channel. |
| TLV Encoded Burst Descriptors 124 | Data blocks which describe the parameters for data transmission to be implemented for each burst. |

The upstream channel identifier field 114 typically contains a value that identifies the upstream channel to which the UCD message 110 applies. As with the upstream channel identifier field 84 within a MAP message 80, the upstream channel identifier field 114 may distinguish upstream channels when there is more than one upstream channel.

The CMTS 30 sends the transmission parameters to the cable modems 28 as TLV encoded channel descriptors 122 or as TLV encoded burst descriptors 124. TLV encoding is known to those skilled in the art. A selection of parameters for the overall channel and the bursts are given in Table 3 above. The CMTS 30 encodes these parameters as channel or burst descriptors and incorporates them into a UCD message 110 to reconfigure one or more cable modems 28. In response, a cable modem 28 reads the UCD message 110, determines if there are any changes in the parameters that describe its upstream channel, and determines if there are any changes in the parameters that describe its burst descriptor. The cable modem 28 reconfigures itself to transmit data according to these parameters. However, it should be understood that other field structures and values for the UCD message 110 might be used for the present invention.

When the CMTS 30 changes the data transmission parameters for an upstream channel, it builds a UCD message 110 with channel and/or burst descriptors that correspond to the new parameters. The UCD message 110 is sent on the downstream channel 26 to the cable modems 28. The CMTS 30 also sends out a corresponding MAP message 80. The burst descriptors in the UCD message 110 correspond to the IUC fields 102 of the MAP Information Elements 100 of the MAP message 80. As each cable modem 28 transmits on the upstream channel it may be doing so according to data transmission parameters that are different from other cable modems 28. In this manner, the cable modems 28 within an upstream usage interval may alternately transmit data packets to the CMTS 30 according to independent data transmission parameters.

Cable Plant Architecture

Figure 7:
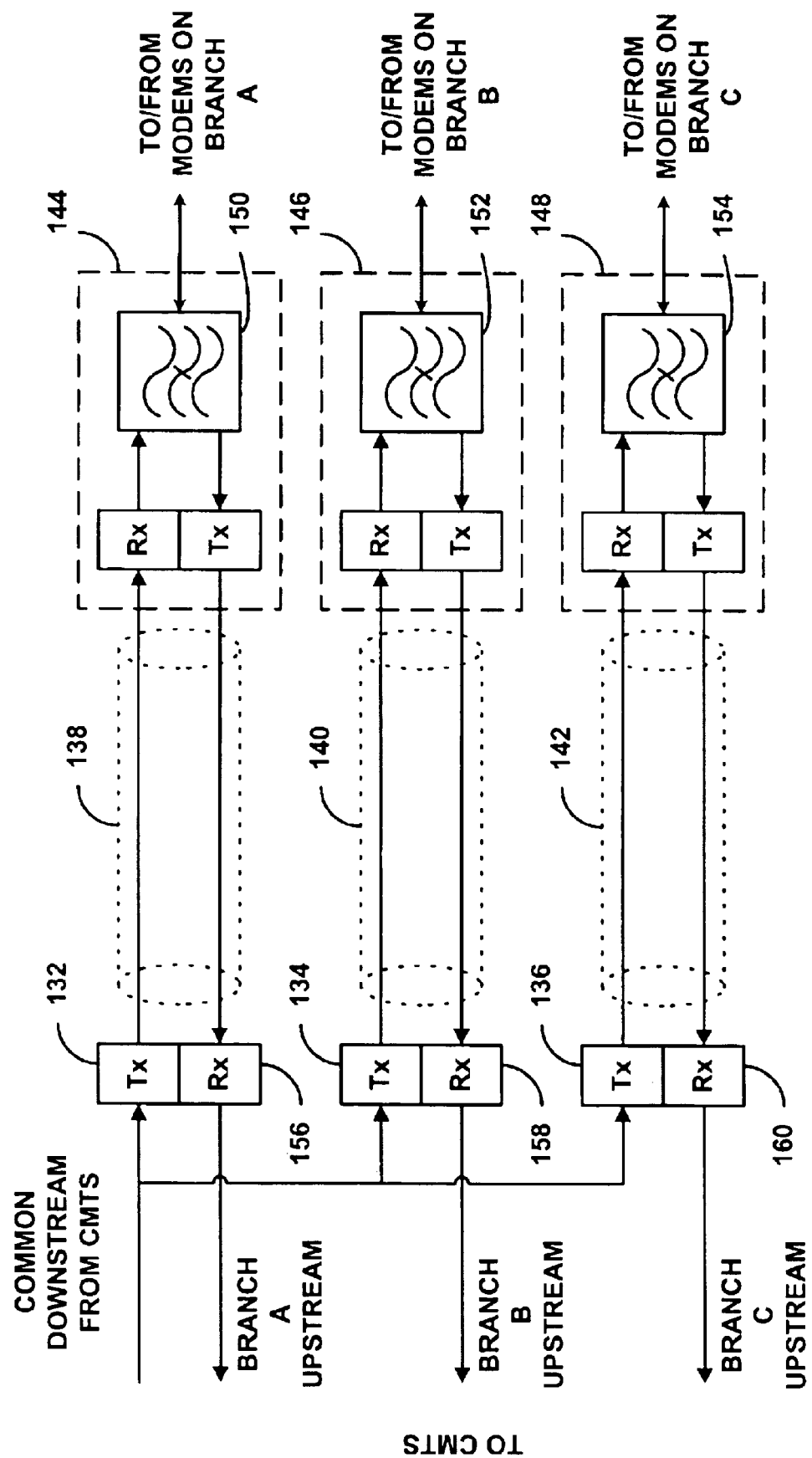
FIG. 7 is a block diagram illustrating a typical architecture for a cable plant in the data-over-cable system depicted in FIG. 1.

FIG. 7 is a block diagram illustrating a typical architecture 130 for the cable plant in the data-over-cable system 16 depicted in FIG. 1. The CMTS 30 generates a single downstream signal, which is converted to optical signals by optical transmitters 132–136 and distributed by optical fiber arranged in fiber bundles 138–142 to geographically isolated O/E nodes 144–148. Each of the O/E nodes 144–148 serves a branch of the HFC network. Each O/E node 144–148 converts its optical signals to RF signals, and distributes the RF signals to the cable modems 28 that are served by the O/E node 144–148.

In the opposite transmission direction, the cable modems 28 on each branch transmit RF signals upstream to their associated O/E node 144–148, where the upstream RF signals are separated from the downstream RF signals by high-low pass filters 150–154 and are converted to optical signals. The HFC network maintains the physical separation of the signals on each branch. Each O/E node 144–148 transmits the upstream optical signals through a separate fiber bundle 138–142 to associated optical receivers 156–160 at the head-end 18 of the data-over-cable system 16. The CMTS 30 receives the separated upstream optical signals from the respective optical receivers 156–160 and typically processes each upstream signal independently of the other.

In the most common arrangement, the operator of the data-over-cable system 16 typically configures the upstream signals for different branches to operate on the same frequency. The rationale for using the same frequency is that bandwidth may be restrictive but the signals from different branches are physically isolated from each other on different fiber bundles 138–142. Typically, therefore, the upstream transmission bursts from different branches do not interfere. Because the upstream signals from the separate branches are independent, but all branches are served by the common downstream channel, the branches are distinguished by having different values for the upstream channel identifiers that are placed in the upstream channel identifier fields 84, 114 of the MAP message 80 and the UCD message 110. Each cable modem 28 therefore receives the MAP messages 80 and the UCD messages 110 for all branches from the common downstream channel but responds only to those messages that contain the upstream channel identifier for the branch to which it is connected.

Cable Modem Initialization and Registration

The CMTS 30 schedules and configures cable modem 28 data transmissions as discussed above. However, when a new cable modem 28 joins the data-over-cable system 16, it must undergo initialization and registration procedures before the data-over-cable system 16 permits it to transmit data. An initialization procedure is described in the DOCSIS specification and typically includes: scanning for a downstream channel and establishing synchronization with the CMTS 30; obtaining upstream transmission parameters from a UCD 110 message; ranging; establishing IP 58 connectivity; establishing the time of day; transferring operational parameters; and initializing Baseline Privacy.

As part of the initialization procedure, the cable modem 28 searches for a downstream channel. Typically, the cable modem 28 stored its parameters, such as the frequency of the last accessed downstream channel, in non-volatile memory during its last operation. The cable modem 28 tries to reacquire this downstream channel, but if it fails then the cable modem 28 typically scans the downstream frequency band until it finds a downstream signal with which it may synchronize.

Once it synchronizes with the downstream channel, the cable modem 28 monitors the channel and searches for UCD messages 110. When a cable modem 28 is installed on the network for the first time, however, it has no prior information concerning on which branch it is installed. To determine the branch, the cable modem 28 collects the UCD messages 110 which are sent within the downstream signal. The branches are distinguished by different values in the upstream channel identifier field 114 in the UCD message 110. The cable modem 28 attempts to communicate with the CMTS 30 by transmitting according to each UCD message 110 which it has received.

Each UCD message 110 may contain the data transmission parameters for an upstream channel upon which the cable modem 28 may transmit data to the CMTS 30. Once the cable modem 28 has selected a suitable UCD message 110 and configured itself to transmit on the corresponding upstream channel as identified in the upstream channel identifier field 114, the cable modem 28 enters a ranging phase.

The ranging phase discerns a timing offset such that the cable modem's 28 transmissions are aligned to the appropriate mini-slot boundary. Ranging adjusts each cable modem's 28 timing offset such that data bursts transmitted by the cable modem 28 arrive at the CMTS 30 at the correct instant in time. The cable modem 28 transmits prematurely by an amount equal to the timing offset to ensure that the signal arrives at the CMTS 30 just when it is expected. Other transmission parameters, such as transmitted power from the cable modem 28, are also adjusted during the ranging phase.

First, the cable modem 28 monitors MAP messages 80 and looks for a MAP message 80 whose upstream channel identifier field 84 value is the same as that for the upstream channel identifier field 114 of the selected UCD message 110. As described above in relation to FIG. 5, the MAP Information Elements 100 designate intervals for cable modem 28 transmission within the usage interval covered by the MAP message 80. Each MAP Information Element 100 corresponds to a transmission interval, identifies which cable modem 28 is permitted to transmit in the interval using a Service Identifier 76 for the cable modem 28, specifies what type of transmission is permitted using an Interval Usage Code 102, and tells the cable modem 28 when to begin transmission using an offset 104. As described above and in DOCSIS, the types of permitted transmission for the interval include a short data grant and a long data grant. Additionally, the IUC 102 may indicate that the interval is to be used for ranging in an Initial Maintenance or Station Maintenance as is known to those skilled in the cable modem art.

The cable modem 28 finds a MAP Information Element 100 in the MAP message 80 that has an IUC 102 indicating an Initial Maintenance interval. The CMTS 30 has reserved this time interval for receiving ranging signals from any cable modems 28 that are initializing on this particular upstream channel. The cable modem 28 has also reserved this time interval for starting its ranging phase. The Initial Maintenance interval is a contention interval and many cable modems 28 on the upstream channel may also use this interval to start ranging. During this interval, the SID 76 for the Initial Maintenance interval in the MAP Information Elements 100 is typically a broadcast/multicast SID 76. This SID 76 is acceptable because the cable modems 28 have not yet registered and so the cable modems 28 have not yet been assigned SIDs 76 by the CMTS 30.

Figure 8:
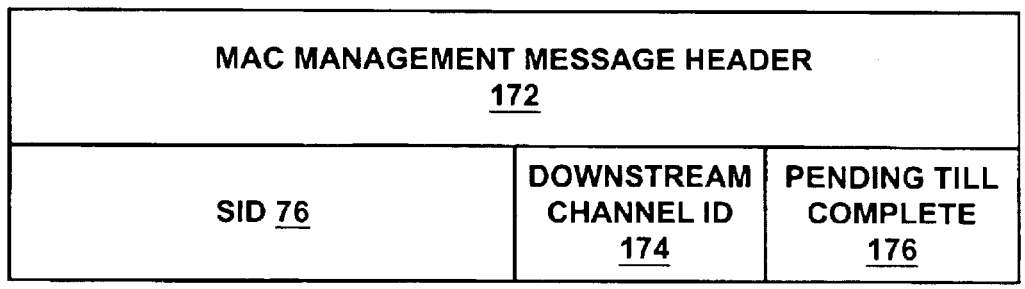
FIG. 8 is a block diagram illustrating the structure of a ranging request message that may be transmitted by a cable modem in the data-over-cable system of FIG. 1.

When the Initial Maintenance interval occurs for the upstream channel corresponding to the upstream channel identifier in the MAP message 80 and the UCD message 110, the cable modem 28 sends a ranging request ("RNG-REQ") message upstream to the CMTS 30. FIG. 8 is a block diagram illustrating a preferred structure of a RNG-REQ message 170. The Ranging Request message 170 includes a MAC management header field 172, a service identifier field 76, a downstream channel identifier field 174, and a pending till complete field 176. Descriptions for the RNG-REQ message 170 fields are shown in Table 5.

TABLE 5

| RNG-REQ message 170 Parameter | Description |
| --- | --- |
| MAC Management Message Header 172 | The header of this message identifying it as a Ranging Request message. |
| SID 76 | For RNG-REQ messages transmitted in Initial Maintenance intervals:<br>1. Initialization SID if cable modem 28 is attempting to join the network;<br>2. Initialization SID if cable modem 28 has not registered and is changing downstream channels;<br>3. Temporary SID if cable modem 28 has not yet registered and is changing upstream channels; and<br>4. Registration SID if cable modem 28 is registered and is changing upstream channels.<br>For RNG-REQ messages transmitted in Station Maintenance intervals: Assigned SID. |
| Downstream Channel ID 174 | The identifier of the downstream channel on which the cable modem 28 received the initial UCD message 110. |
| Pending Till Complete 176 | If zero, all previous Ranging Response attributes have been applied prior to transmitting this RNG-REQ. In non-zero, this is the time estimated to be needed to complete assimilation of ranging parameters. |

The initialization SID 76 that the cable modem 28 places in the SID 76 field of the RNG-REQ message 170 is typically zero. This indicates to the CMTS 30 that the cable modem 28 has not registered before. If the SID 76 is non-zero, the CMTS 30 assumes that the cable modem 28 has previously undergone initialization but on another upstream channel.

Figure 9:
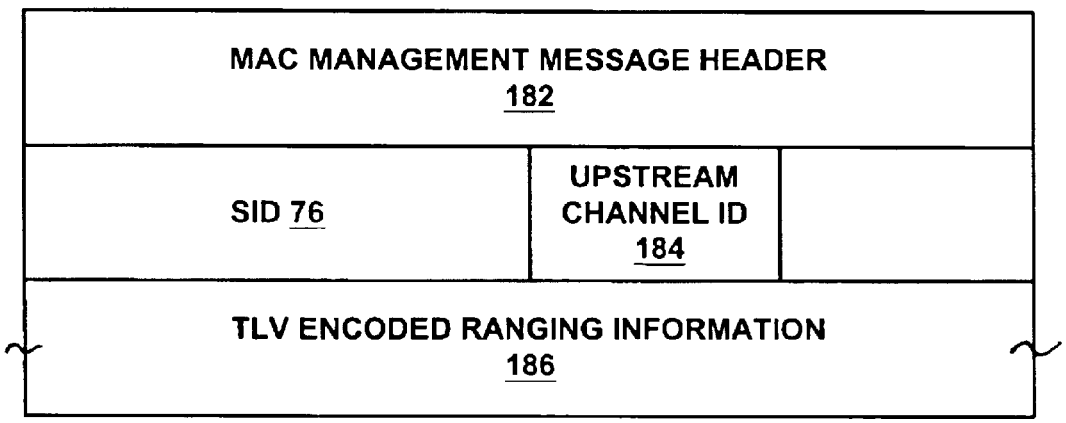
FIG. 9 is a block diagram illustrating the structure of a ranging response message transmitted by a CMTS in the data-over-cable system of FIG. 1.

In response to receiving the RNG-REQ message 170 from the cable modem 28, the CMTS 30 transmits a Ranging Response ("RNG-RSP") message 180. FIG. 9 is a block diagram illustrating a preferred structure of a RNG-RSP message 180. The Ranging Response message 180 includes a MAC management header field 182, a service identifier field 76, an upstream channel identifier field 184, and a TLV encoded ranging information field 186. Descriptions for the RNG-RSP message 180 fields are shown in Table 6.

TABLE 6

| RNG-RSP message 180 Parameter | Description |
| --- | --- |
| MAC Management Message Header 182 | The header of this message identifying it as a Ranging Response message. |
| SID 76 | For RNG-REQ messages transmitted in Initial Maintenance intervals that had an initialization SID:<br>Assigned temporary SID.<br>For RNG-REQ messages not transmitted in Initial Maintenance intervals that had an initialization SID:<br>Same SID as in RNG-REQ.<br>If instructing cable modem 28 to move to a different channel:<br>Initialization SID. |
| Upstream Channel ID 184 | The identifier of the upstream channel on which the CMTS 30 received the RNG-REQ message. |
| TLV encoded ranging information 186 | Includes:<br>1. Timing adjust information;<br>2. Power adjust information;<br>3. Frequency adjust information;<br>4. cable modem 28 transmitter equalization information;<br>5. Ranging status;<br>6. Downstream frequency override; and<br>7. Upstream channel ID override. |

During the initial ranging, the RNG-RSP message 180 contains a temporary SID 76 for the cable modem 28. This SID 76 identifies the cable modem 28 to the CMTS 30 until it has completed a registration process. The RNG-RSP message 180 also includes information on RF power adjustments, transmission frequency adjustments, and offset timing adjustments that the cable modem 28 should adopt so as to improve communications from the cable modem 28 to the CMTS 30.

In response to the RNG-RSP message 180, the cable modem 28 monitors the downstream channel and again examines the MAP messages 80. In particular, the cable modem 28 looks for a MAP Information Element 100 in the MAP messages 80 for the selected upstream channel that has an IUC 102 indicating a Station Maintenance interval and an associated SID 76 field containing the temporary SID 76 assigned to the cable modem 28. The CMTS 30 has reserved this time interval for receiving ranging signals from only the cable modem 28 associated with the temporary SID 76.

When the appropriate Station Maintenance interval occurs, the cable modem 28 sends another RNG-REQ message 170 upstream to the CMTS 30. In return, the CMTS 30 returns a RNG-RSP message 180 with appropriate corrections to the transmission parameters in the ranging information field 186. The sequence of RNG-REQ 170 and RNG-RSP 180 is repeated until the CMTS 30 sends a RNG-RSP message 180 notifying the cable modem 28 that the ranging is successful.

Figure 10B:
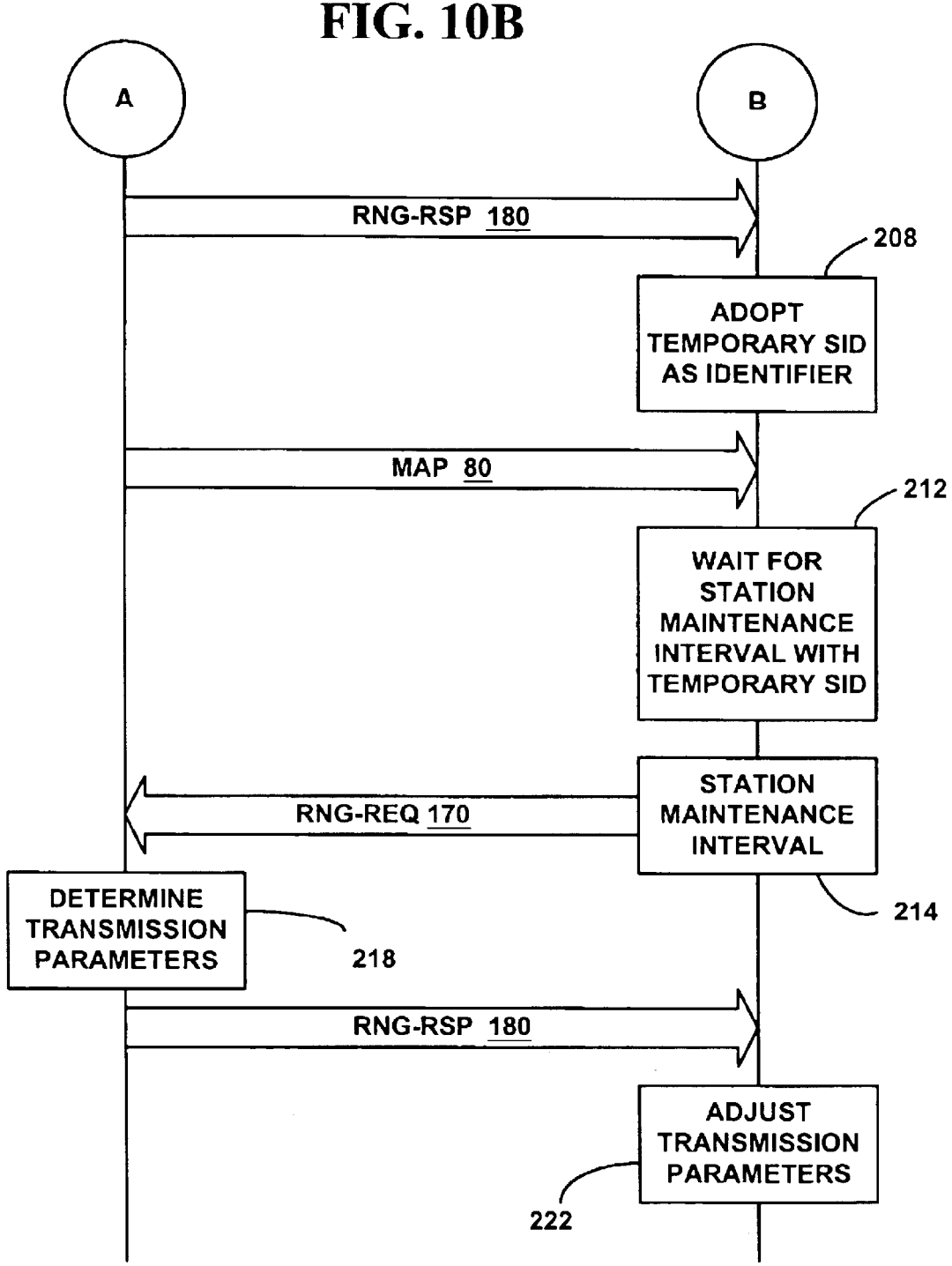

FIG. 10 is a block diagram illustrating a typical message flow 190 during cable modem 28 initialization. The CMTS 30 sends a UCD message 110 downstream describing the parameters for transmission on the particular upstream channel identified in the upstream channel identifier field 114. The cable modem 28 receives the UCD message 110, extracts the transmission parameters from the UCD message 110, and configures itself to transmit on the particular upstream channel with these parameters at step 194. The cable modem 28 then monitors the downstream channel for a MAP message 80 with the same value of the identifier for the upstream channel in its upstream channel identifier field 84. When the cable modem 28 receives such a MAP message 80, the cable modem 28 determines when the next Initial Maintenance interval will occur at step 198.

During the Initial Maintenance interval 200, the cable modem 28 sends a RNG-REQ message 170 upstream to the CMTS 30. The RNG-REQ message 170 may have its SID field 76 set to zero to indicate that the cable modem 28 is initializing. The CMTS 30 receives the RNG-REQ message 170 and selects a temporary SID for the cable modem 28 at step 204. The CMTS 30 sends a RNG-RSP message 180 with this temporary SID to the cable modem 28. The cable modem 28 adopts this temporary SID as its identifier at step 208.

The cable modem 28 waits for another MAP message 80 for the upstream channel that includes a MAP information element 100 for a Station Maintenance interval for the temporary SID at step 212. When this Station Maintenance interval arrives at step 214, the cable modem 28 transmits another RNG-REQ message 170 upstream to the CMTS 30. In response, the CMTS 30 determines adjustments to the cable modem 28 transmission parameters at step 218 and transmits the parameters to the cable modem 28 in a RNG-RSP message 180. The cable modem 28 receives the RNG-RSP message 180 and correspondingly adjusts its transmission parameters at step 222.

Unfortunately, the cable modem's 28 attempts to range may interfere with legitimate upstream transmissions. For example, if the initializing cable modem 28 is on Branch A of FIG. 7 but first receives a UCD message 110 on the common downstream channel with the upstream channel identifier for Branch B, the cable modem 28 will attempt to range as if it were on Branch B. First, the cable modem 28 will configure its transmission parameters according to the TLV-encoded descriptors 122, 124 of the Branch B UCD message 110. The cable modem 28 will then wait for a MAP message 80 containing the upstream channel identifier for Branch B. Once it receives such a MAP message 80, the cable modem 28 examines the IUC 102 fields for an Initial Maintenance interval. When the Initial Maintenance interval occurs, the cable modem 28 will attempt to communicate with the CMTS 30. The initial maintenance interval for Branch B, however, may coincide with an interval on Branch A that is reserved for data transmission. Therefore, the initializing cable modem 28 may interfere with all other cable modems 28 on Branch A because the data transmissions are at a common frequency and the cable modem 28 is transmitting according to the wrong MAP message 80.

Alignment of Initial Maintenance Intervals

Figure 11:
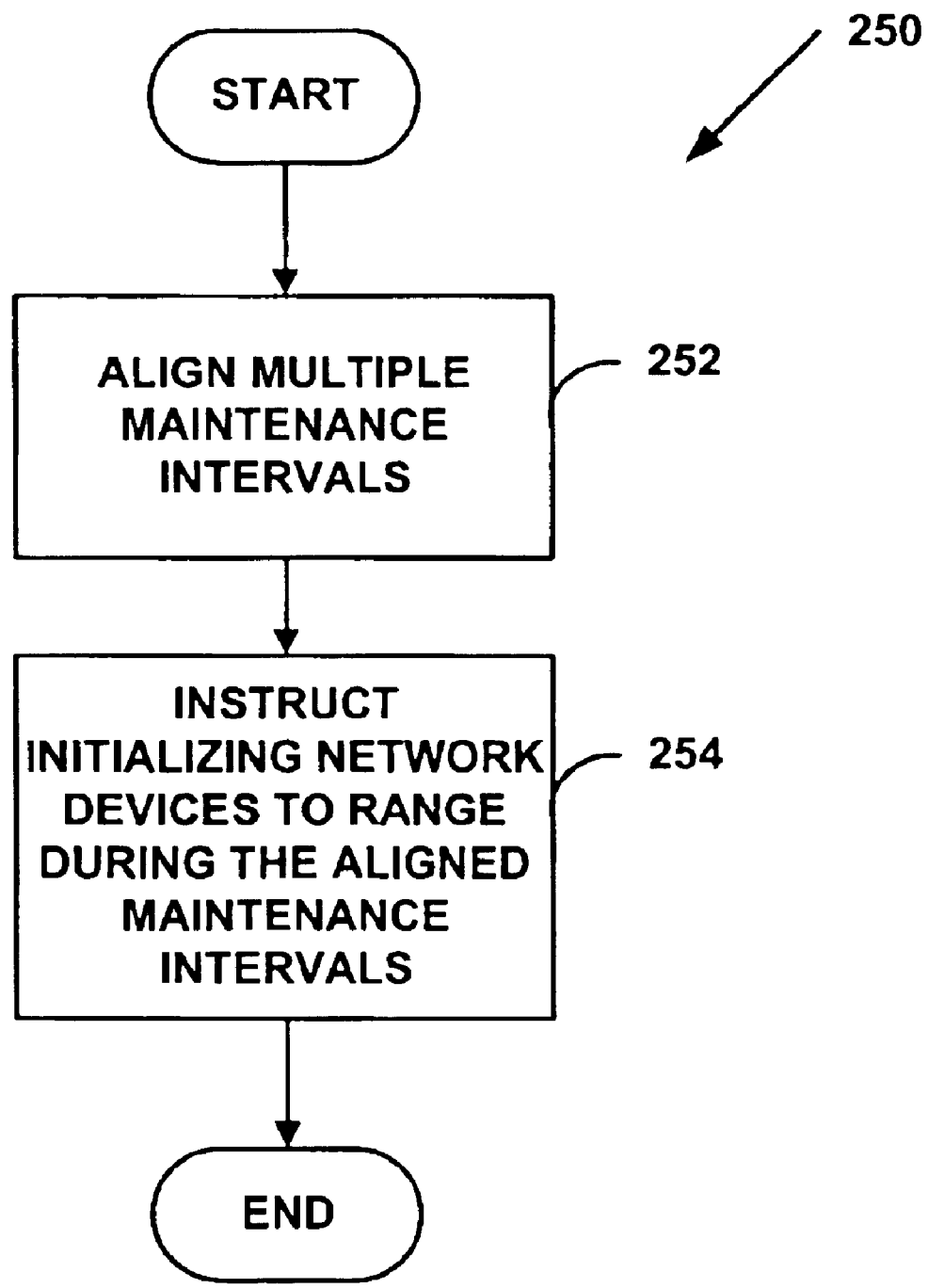
FIG. 11 is a flow diagram illustrating a preferred method for reducing interference from initializing network devices in the data-over-cable system depicted in FIG. 1.

FIG. 11 is a flow diagram illustrating a preferred method 250 for reducing interference from initializing network devices. The method 250 includes aligning multiple maintenance intervals at step 252. Each of the maintenance intervals is associated with a corresponding upstream channel. At step 254 the initializing network devices are instructed to range during the aligned maintenance intervals.

The above problem of an initializing cable modem 28 interfering with legitimate data transmissions from other cable modems 28 due to upstream channel ambiguities may be resolved by scheduling the Initial Maintenance intervals for all upstream channels to occur simultaneously. Thus, if a cable modem 28 on one branch ranges according to the timing for another branch, the RNG-REQ messages 170 will not interfere with data transmissions because no other cable modems 28 have been scheduled to transmit data in this common Initial Maintenance interval. The lack of collisions between ranging messages and data transmissions may result in fewer retransmissions of ranging messages on the one channel and fewer retransmissions of data on the other channel.

Upon receiving the RNG-REQ messages 170, the CMTS 30 typically sends a RNG-RSP message 180 to the cable modem 28. The upstream channel identifier field 184 of the RNG-RSP message 180 contains the identifier for the branch of the HFC network on which the CMTS 30 received the RNG-REQ message 170. The CMTS 30 determines on which branch it received the RNG-REQ message 170 by determining which optical receiver 150–156 received the RNG-REQ message 170. Upon receipt of the RNG-RSP message 180 from the CMTS 30, the cable modem 28 may determine that the upstream channel identifier field 184 contains a different identifier from the content of the upstream channel identifier field 114 of the UCD message 110 and MAP message 80 it originally used for configuration. The cable modem 28 may then cease using the UCD message 110 and MAP message 80 it had erroneously adopted and instead reconfigure itself according to the UCD messages 110 and MAP messages 80 appropriate for the newly received identifier from the RNG-RSP message 180. This procedure may result in a quicker registration time for cable modems 28.

A scheduling program on the CMTS 30 determines a sequence of intervals for transmission on the upstream channels and determines the type of transmissions that may occur during the intervals. In response, the CMTS 30 builds a MAP message 80 for each upstream channel and transmits them downstream to the cable modems 28. The scheduling program may therefore include a routine for aligning the Initial Maintenance intervals for the upstream channels because it determines the MAP messages 80 for all the upstream channels. It should be understood, however, that the preferred embodiments are not limited to aligning Initial Maintenance intervals and that other types of upstream transmissions, such as Station Maintenance intervals or combinations of Station Maintenance and Initial Maintenance intervals, may be aligned to reduce interference from initializing cable modems 28.

In accordance with the DOCSIS standard, the CMTS 30 schedules the Initial Maintenance intervals according to cycles of a system clock. Typically, the CMTS 30 has a 10.24 MHz system clock. The CMTS 30 derives the mini-slots for upstream transmission opportunities by dividing the system clock by a power of two. For example, from the 10.24 MHz system clock, the CMTS 30 may derive mini-slots of duration: 12.5 $\mu$s, 25 $\mu$s, 50 $\mu$s, 100 $\mu$s, 200 $\mu$s, 400 $\mu$s, or 800 $\mu$s. Also, the CMTS 30 may count mini-slots by examining upper bits of the system clock. For example, if the system clock is a 32-bit clock that increments at the 10.24 MHz rate, the eighth highest bit cycles every 12.5 $\mu$s, the ninth highest bit cycles every 25 $\mu$s, and so on down to the fourteenth highest bit, which cycles every 800 $\mu$s. Thus a count of mini-slots may be achieved by examining the cycling of one bit of the system clock. It should be understood, however, that the present invention is not limited to counting mini-slots by examination of bits of the system clock, or that the preferred methods are restricted to data-over-cable systems with a system clock. Other methods for counting mini-slots and other configurations of clocks are contemplated.

The CMTS 30 may schedule upstream channel transmissions according to differing mini-slot sizes. For example, with reference to FIG. 7, the CMTS 30 may schedule upstream transmissions from cable modems 28 on Branch A according to a 50 µs mini-slot size, while scheduling upstream transmissions from cable modems 28 on Branch B according to a 200 µs mini-slot size. Additionally, upstream transmission on each branch may occur according to different symbol rates. For example, with reference to Table 3, the symbol rate of upstream transmissions on Branch B may be 160 ksym/s, while the symbol rate of upstream transmissions on Branch C may be 640 ksym/s. In one configuration of the data-over-cable system 16, all the upstream channels share a common symbol rate and mini-slot size. In another configuration, however, the cable modems 28 on each upstream branch may transmit according to different symbol rates and/or mini-slot sizes compared to cable modems 28 on another branch. Alignment for both situations in which the symbol rates and/or mini-slot sizes differ or are shared are described below.

Alignment When the Symbol Rates and Mini-slot Sizes are Shared

Figure 12:
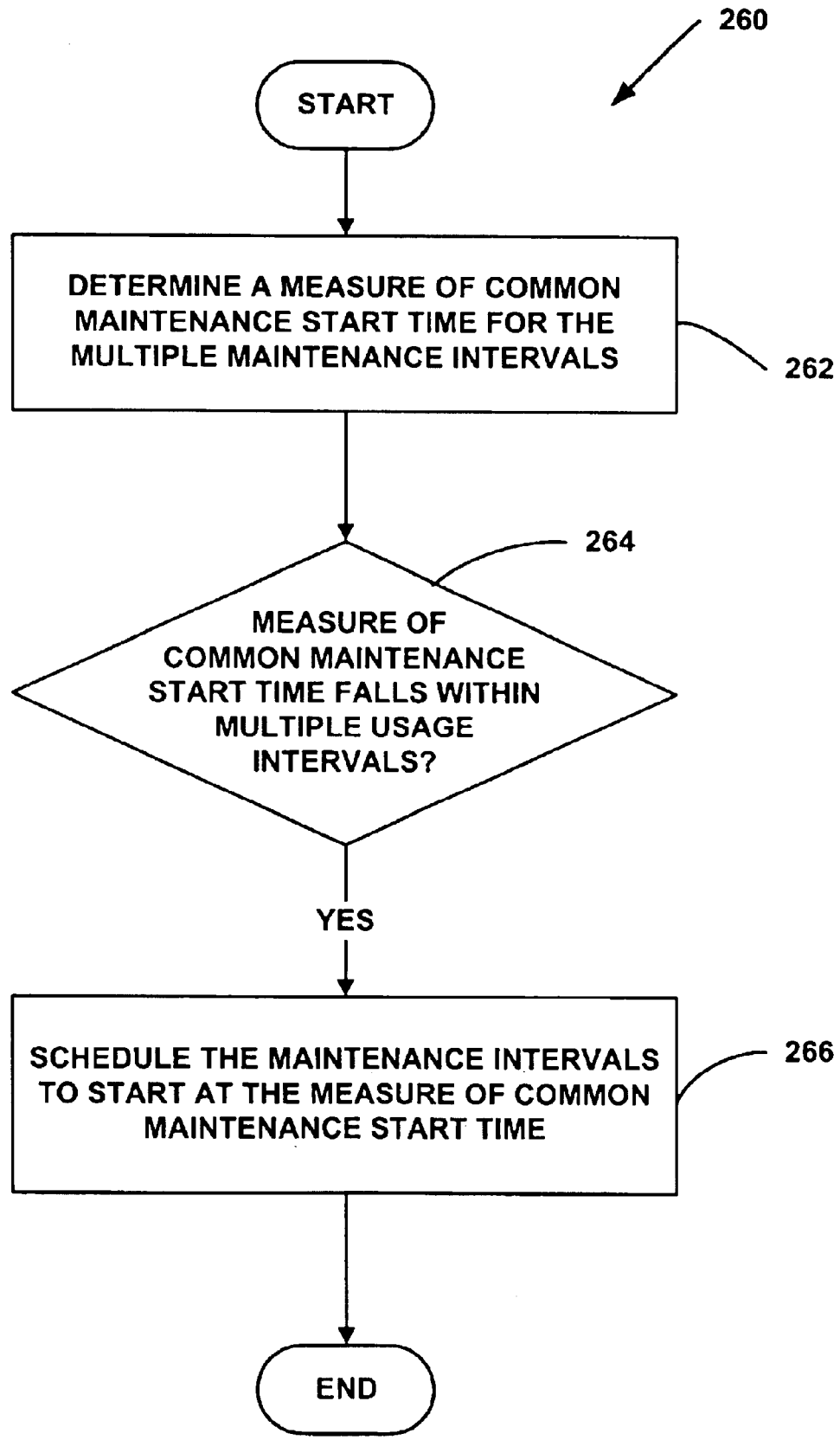
FIG. 12 is a flow diagram illustrating a preferred method for aligning maintenance intervals in the method depicted in FIG. 11.

FIG. 12 is a flow diagram illustrating a preferred method 260 for aligning multiple maintenance intervals at step 252 of the method 250 above. The method 260 of FIG. 12 is preferred when the upstream channels share a common symbol rate and mini-slot size. The method 260 includes determining a measure of common maintenance start time for the multiple maintenance intervals at step 262. At step 264, the CMTS 30 decides whether the measure of common maintenance start time falls within multiple usage intervals. Each of the multiple usage intervals is associated with an upstream channel. When the measure of common maintenance start time falls within the multiple usage intervals, the CMTS 30 schedules the maintenance intervals to start at the measure of common maintenance start time at step 266.

Typically, the CMTS 30 schedules periodic Initial Maintenance intervals. A preferred period for the Initial Maintenance intervals is a basic insertion time, measured in seconds, and is a configurable parameter of the data-over-cable system 16. By dividing by the mini-slot size, measured in seconds, the basic insertion time corresponds to an integral number of $T_B$ mini-slots. It should be understood, however, that the period for the Initial Maintenance intervals is not limited to the basic insertion time and that other scheduling periods may be used, such as scheduling an Initial Maintenance interval during every alternate MAP message 80.

The CMTS 30 constructs MAP messages 80 for the upstream channels of the data-over-cable system 16, which designate order, duration, and types of transmissions from the cable modems 28. In general, each MAP message 80 need not designate a series of transmission intervals that jointly occupies a common number of mini-slots; the total number of mini-slots for upstream transmissions, represented by the MAP Information Elements field 100, may vary from MAP message 80 to MAP message 80 and from upstream channel to upstream channel.

To determine whether the CMTS 30 may schedule an aligned Initial Maintenance interval in the MAP messages 80 for each upstream channel, the CMTS 30 calculates that the aligned Initial Maintenance interval should start at a time corresponding to an integral number of $T_B$ mini-slots. As the CMTS 30 system clock provides the present time, corresponding to an integral number of $T_P$ mini-slots, the CMTS 30 calculates that the aligned Initial Maintenance interval should start at a time as illustrated in Equation (1):

$$T_{IM}=T_P+T_B-T_P\mathrm{mod}(T_B) \quad (1)$$

measured in mini-slots. Equation (1) employs modular arithmetic as is familiar to those of ordinary skill in the art. The CMTS 30 therefore schedules the aligned Initial Maintenance intervals for each upstream channel to start at multiples of $T_B$ mini-slots, if such an alignment is possible.

In one embodiment, the units for the time calculations disclosed herein are measured in mini-slots. In an alternative embodiment, the units for the time calculations disclosed herein are measured in seconds. In yet another embodiment, the units for the time calculations disclosed herein are measured in numbers of cycles of the system clock. It should be understood, however, that the units are not limited to measuring time in seconds, numbers of mini-slots for an upstream channel, or numbers of cycles of the system clock, and that other units for measurement of time are possible for each upstream channel.

If the scheduled start of the aligned Initial Maintenance interval falls within the usage interval allocated by the next MAP message 80 for each upstream channel, the CMTS 30 may insert an element corresponding to an Initial Maintenance interval into the MAP Information Elements 100 of the next MAP message 80 for each upstream channel with an appropriate offset 104. To determine whether the element corresponding to an Initial Maintenance interval may be inserted into the next MAP message 80 for a particular upstream channel, the CMTS 30 determines whether the common start time for the Initial Maintenance interval occurs within the upstream channel's usage interval. Thus the CMTS 30 determines whether TIM occurs after the allocation start time 90 of the next MAP message 80, $T_S$ mini-slots, but before the end of usage interval allocated by this MAP message 80. Each upstream channel may have a different value for $T_S$ and the CMTS 30 may select $T_S$ for each upstream channel so that the transmissions allocated by the next MAP message 80 do not overlap remaining transmissions allocated by the previous MAP message 80. The CMTS 30 may insert the element corresponding to the Initial Maintenance interval if the scheduled start time satisfies the expression as illustrated in Equation (2):

$$T_S \leq T_{IM} < T_S+L_{MAP} \quad (2)$$

where $L_{MAP}$ is the length in mini-slots of the entire usage interval associated with the MAP message 80 for the upstream channel. Each upstream channel may have a different value for the number of mini-slots of transmission allocated by the MAP message 80, $L_{MAP}$. If $T_{IM}$ does not satisfy Equation (2) for all the upstream channels, the CMTS 30 schedules intervals for data grants, Station Maintenance, Request messages, and other upstream transmissions, but not Initial Maintenance, according the scheduler program. The CMTS 30 then constructs MAP Information Elements 100 corresponding to the scheduled intervals, and transmits MAP messages 80 for the upstream channels to the cable modems 28.

If the start time of the aligned Initial Maintenance interval falls within the usage interval allocated by the next MAP message 80 for each of the upstream channels according to Equation (2), the CMTS 30 schedules a common, aligned Initial Maintenance interval to commence at time TIM for all upstream channels. The CMTS 30 also schedules the other types of upstream transmissions for each upstream channel to occur before and after their respective Initial Maintenance intervals. In particular, the CMTS 30 schedules ($T_{IM}-T_S$) mini-slots before the Initial Maintenance interval for upstream transmissions on each upstream channel. Provided this number of mini-slots is sufficiently large to accommodate one or more types of upstream transmissions, the CMTS 30 constructs the appropriate MAP Information Elements 100 for each upstream channel corresponding to the scheduled intervals.

Also, the CMTS 30 schedules a certain number of mini-slots after the Initial Maintenance interval for upstream transmissions on each of the upstream channels. If the length of the Initial Maintenance interval in mini-slots is $L_{IM}$ for the upstream channel, the number of mini-slots after the Initial Maintenance interval is given by the expression as illustrated in Equation (3):

$$\max(0, T_S+L_{MAP}-[T_{IM}+L_{IM}]) \quad (3)$$

Each upstream channel may have a different value for the number of mini-slots in an Initial Maintenance interval, $L_{IM}$. Provided the number of mini-slots after the Initial Maintenance interval is sufficiently large to accommodate one or more types of upstream transmissions, the CMTS 30 constructs the appropriate MAP Information Elements 100 corresponding to the scheduled intervals for each upstream channel. In this manner, the CMTS 30 aligns the Initial Maintenance intervals for the upstream channels, and schedules other types of upstream transmissions on each upstream channel outside of the aligned Initial Maintenance interval common to all the upstream channels but within the usage intervals for each of the upstream channels.

Having aligned the Initial Maintenance intervals for the upstream channels, an initializing cable modem 28 may not interfere with legitimate upstream transmissions from other cable modems 28. An initializing cable modem 28 in the data-over-cable network system 16 may receive a UCD message 110 and a MAP message 80 for an upstream channel that is associated with another branch of the cable plant. After determining the Initial Maintenance interval from the MAP message 80, the initializing cable modem 28 may attempt to range at the wrong time for its branch. As the CMTS 30 has aligned the Initial Maintenance intervals, however, the ranging messages from the initializing cable modem 28 will not collide with other types of messages transmitted upstream on the branch.

Alignment When the Symbol Rates and/or Mini-slot Sizes Vary

Typically, the mini-slot size or the symbol rate may be different for each upstream channel. For example, an upstream channel with a low symbol rate and a large mini-slot size may have an Initial Maintenance interval that lasts much longer than an Initial Maintenance interval for another upstream channel having a high symbol rate and small mini-slot size. In this case, the CMTS 30 may schedule one Initial Maintenance interval for the former upstream channel and simultaneously schedule many consecutive Initial Maintenance intervals for the latter upstream channel.

Figure 13:
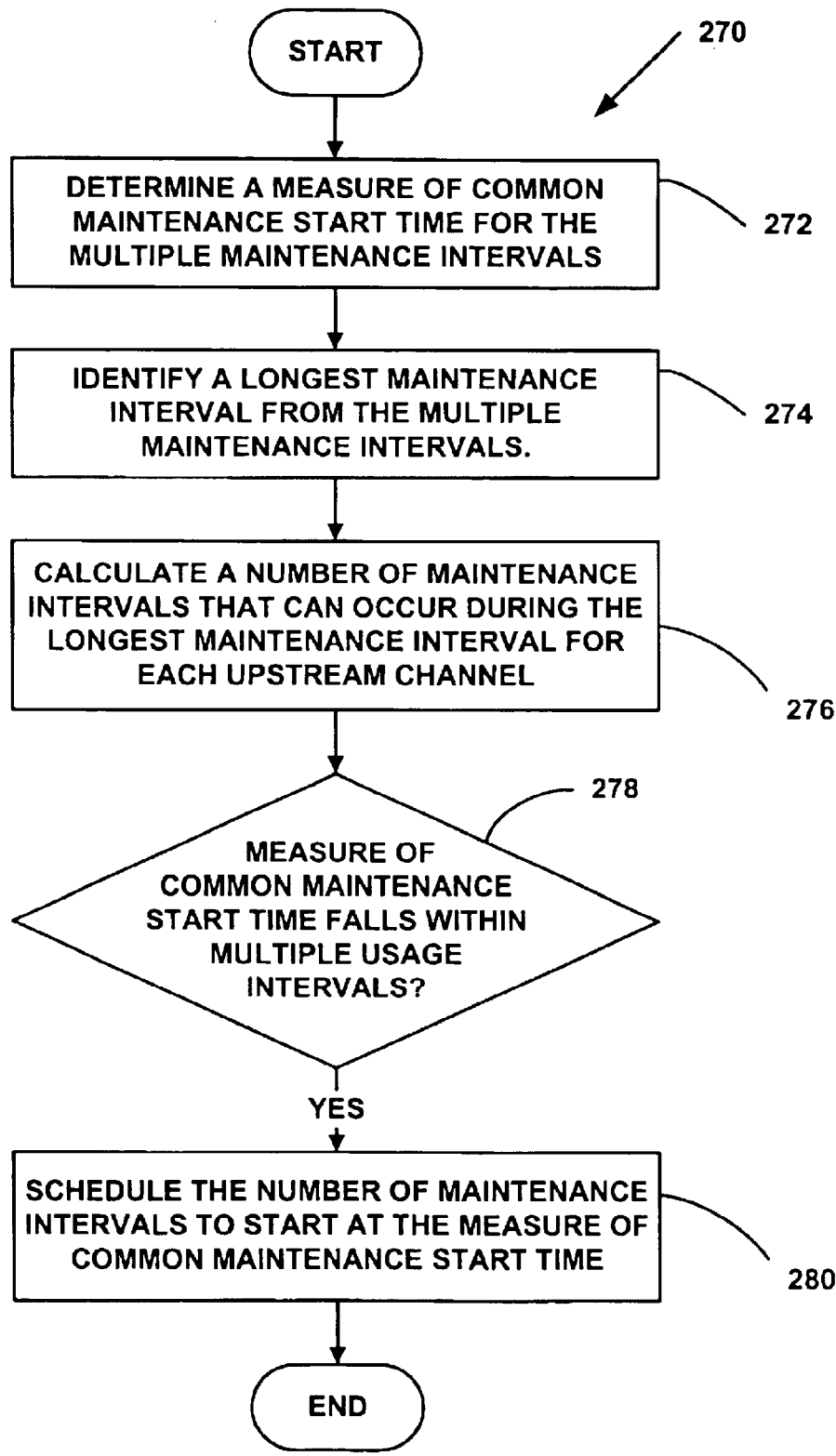
FIG. 13 is a flow diagram illustrating an alternative preferred method for aligning maintenance intervals in the method depicted in FIG. 11.

FIG. 13 is a flow diagram illustrating a preferred method 270 for aligning multiple maintenance intervals at step 252 of the method 250 shown in FIG. 11. The method 270 shown in FIG. 13 is preferred when the upstream channels do not share a common symbol rate and/or mini-slot size. The method 260 includes determining a measure of common maintenance start time for the multiple maintenance intervals at step 272. At step 274, the CMTS 30 identifies a longest maintenance interval from the multiple maintenance intervals. The length of a maintenance interval may be different for each upstream channel and, if so, the longest is identified. The CMTS 30 calculates a number of maintenance intervals that can occur during the longest maintenance interval for each upstream channel at step 276. In this manner, all upstream channels may simultaneously experience maintenance intervals for a period of the longest such interval. At step 278, the CMTS 30 decides whether the measure of common maintenance start time falls within multiple usage intervals. Each of the multiple usage intervals is associated with an upstream channel. When the measure of common maintenance start time falls within the multiple usage intervals, for each upstream channel of the plurality of upstream channels, the CMTS 30 schedules the number of maintenance intervals to start at the measure of common maintenance start time at step 280.

As was the case above where the mini-slot size and symbol rates were common to all upstream channels, the period for the Initial Maintenance intervals is preferably a basic insertion time, measured in seconds, and is a configurable parameter of the data-over-cable system 16. By dividing by the mini-slot size for each upstream channel, measured in seconds, this basic insertion time corresponds to $T_B$ mini-slots in each upstream channel's measure of mini-slots. The number of mini-slots, $T_B$, may vary amongst upstream channels because of the differing mini-slot sizes, but each upstream channel's number of mini-slots corresponds to the same value for the basic insertion time as measured in seconds. It should be understood, however, that the period for the Initial Maintenance intervals is not limited to the basic insertion time and that other scheduling periods may be used, such as scheduling an Initial Maintenance interval during every alternate MAP message 80 for the upstream channel.

To determine whether the CMTS 30 may schedule aligned Initial Maintenance intervals in the MAP messages 80 for each upstream channel, the CMTS 30 calculates that the aligned Initial Maintenance interval for each upstream channel should start at a time corresponding to a number TIM mini-slots in the upstream channel's measure of mini-slots. As the CMTS 30 system clock provides the present time, corresponding to a number $T_P$ mini-slots in the upstream channel's measure of mini-slots, the CMTS 30 calculates that the aligned Initial Maintenance interval should start at a time as illustrated in Equation (4):

$$T_{IM}=T_P+T_B-T_P \bmod(T_B) \quad (4)$$

for each upstream channel in the upstream channel's measure of mini-slots.

In one embodiment, the units for the time calculations disclosed herein are measured in numbers of mini-slots corresponding to the mini-slot size for each upstream channel. In an alternative embodiment, the units for the time calculations disclosed herein are measured in seconds. In yet another embodiment, the units for the time calculations disclosed herein are measured in numbers of cycles of the system clock. It should be understood, however, that the units are not limited to measuring time in seconds, numbers of mini-slots for an upstream channel, or numbers of cycles of the system clock, and that other units for measurement of time are possible for each upstream channel.

To ensure that a sufficiently long period is set aside for aligned Initial Maintenance on all upstream channels, the CMTS 30 determines which upstream channel's Initial Maintenance interval is longest in duration. For example, the CMTS 30 may multiply the length of the Initial Maintenance interval for an upstream channel, LIM measured in mini-slots for this upstream channel, by the duration of each of the upstream channel's mini-slot to convert the length of the Initial Maintenance interval to seconds. By comparing the length of the Initial Maintenance intervals in seconds, the CMTS 30 may determine which upstream channel has the longest Initial Maintenance interval. The length of the longest Initial Maintenance interval is $X_{IM}^{MAX}$ measured in seconds, which may be converted to a number of mini-slots for each upstream channel by dividing by that upstream channel's mini-slot size.

In the upstream channel that has the longest Initial Maintenance interval, $L_{IM}^{MAX}$ mini-slots as measured in the mini-slot size for that upstream channel, the CMTS 30 may schedule only one Initial Maintenance interval. In each other upstream channel, however, the CMTS 30 may simultaneously schedule one or more Initial Maintenance intervals because the length of the MAX Initial Maintenance interval for the upstream channel, $L_{IM}$, is less than $L_{IM}^{MAX}$ mini-slots as measured in the mini-slot size for the upstream channel. The number of mini-slots for each channel, $L_{IM}^{MAX}$, may be different for each upstream channel after converting $X_{IM}^{MAX}$ seconds to the number of mini-slots on the upstream channel by dividing by the mini-slot size for that channel.

The number of Initial Maintenance intervals that may occur on each upstream channel during the longest Initial Maintenance interval is the integer part of the number of that upstream channel's mini-slots for the longest Initial Maintenance interval divided by the number of the upstream channel's mini-slots for its Initial Maintenance interval and is illustrated in Equation (5):

$$N_{IM} = \text{int}(L_{IM}^{MAX}/L_{IM}) \quad (5)$$

Thus, for example, the CMTS 30 may schedule one Initial Maintenance interval on the upstream channel that has the longest Initial Maintenance interval, and may simultaneously schedule $N_{IM}$ Initial Maintenance intervals for each other upstream channel.

If the scheduled start of the aligned Initial Maintenance interval, $T_{IM}$ for each upstream channel, falls within the usage interval allocated by the next MAP message 80 for the upstream channel, the CMTS 30 may insert elements corresponding to one or more Initial Maintenance intervals into the MAP Information Elements 100 of the next MAP message 80 for each upstream channel with appropriate offsets 104. To determine whether the elements corresponding to Initial Maintenance intervals may be inserted into the next MAP message 80 for a particular upstream channel, the CMTS 30 determines whether the common start time for the Initial Maintenance intervals occurs within each upstream channel's usage interval. Thus the CMTS 30 determines whether $T_{IM}$ occurs after the allocation start time 90 of the next MAP message 80, $T_S$ mini-slots, but before the end of usage interval allocated by this MAP message 80. Each upstream channel may have a different value for $T_S$ and the CMTS 30 may select $T_S$ for each upstream channel so that the transmissions allocated by the next MAP message 80 do not overlap remaining transmissions allocated by the previous MAP message 80. The CMTS 30 may insert the element corresponding to the Initial Maintenance interval if the scheduled start time satisfies the expression as illustrated in Equation (6):

$$T_S \leq T_{IM} < T_S + L_{MAP} \quad (6)$$

where $L_{MAP}$ is the length in mini-slots of the entire usage interval allocated by the MAP message 80 for the upstream channel. Each upstream channel may have a different value for the number of mini-slots of transmission allocated by the MAP message 80, $L_{MAP}$. If $T_{IM}$ does not satisfy Equation (6) for all the upstream channels, the CMTS 30 schedules intervals for data grants, Station Maintenance, Request messages, and other upstream transmissions, but not Initial Maintenance, according to the scheduler program. The CMTS 30 then constructs MAP Information Elements 100 corresponding to the scheduled intervals, and transmits MAP messages 80 for the upstream channels downstream to the cable modems 28.

If the start time of the aligned Initial Maintenance interval falls within the transmission time allocated by the next MAP message 80 for each of the upstream channels according to Equation (6), the CMTS 30 schedules a common, aligned Initial Maintenance interval to commence at time $T_{IM}$ for all upstream channels. For each upstream channel, the CMTS 30 schedules $N_{IM}$ Initial Maintenance intervals to occur consecutively on the upstream channel, and the CMTS 30 constructs the appropriate MAP Information Elements 100 for the upstream channel corresponding to the scheduled intervals.

The CMTS 30 also schedules the other types of upstream transmissions for each upstream channel to occur before and after their respective Initial Maintenance intervals. In particular, the CMTS 30 schedules $(T_{IM} - T_S)$ mini-slots before the Initial Maintenance interval for upstream transmissions on each upstream channel. Provided this number of mini-slots is sufficiently large to accommodate one or more types of upstream transmissions, the CMTS 30 constructs the appropriate MAP Information Elements 100 for each upstream channel corresponding to the scheduled intervals.

Also, the CMTS 30 schedules a certain number of mini-slots after the Initial Maintenance intervals for upstream transmissions on each of the upstream channels. As the length of the $N_{IM}$ Initial Maintenance intervals in mini-slots is $L_{IM}^{MAX}$ for the upstream channel, the number of mini-slots after the Initial Maintenance interval is given by the expression as illustrated in Equation (7):

$$\max(0, T_S + L_{MAP} - [T_{IM} + L_{IM}^{MAX}]) \quad (7)$$

Provided the number of mini-slots after the Initial Maintenance interval is sufficiently large to accommodate one or more types of upstream transmissions, the CMTS 30 constructs the appropriate MAP Information Elements 100 corresponding to the scheduled intervals for each upstream channel. In this manner, the CMTS 30 aligns the Initial Maintenance intervals for the upstream channels, and schedules other types of upstream transmissions on each upstream channel outside of the aligned Initial Maintenance interval common to all the upstream channels but within the usage intervals for each of the upstream channels.

Having aligned the Initial Maintenance intervals for the upstream channels, an initializing cable modem 28 may not interfere with legitimate upstream transmissions from other cable modems 28. An initializing cable modem 28 in the data-over-cable network system 16 may receive a UCD message 110 and MAP message 80 for an upstream channel that is associated with another branch of the cable plant. Even though the cable modem 28 transmits with an inappropriate mini-slot size and/or symbol rate, after determining the Initial Maintenance interval from the MAP message 80, the initializing cable modem 28 may attempt to range at the wrong time for its branch. As the CMTS 30 has aligned the Initial Maintenance intervals, however, the ranging messages from the initializing cable modem 28 will not collide with other types of messages transmitted upstream on the branch.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein. Although the network devices that communicate using the data-over-cable system 16 have repeatedly been referred to herein as cable modems 28, it is to be understood that the term "network devices" includes any device that contains the foregoing functionality ascribed to the cable modem 28. Such functionality may be implemented in stand-alone devices, such as the cable modem 28 illustrated in FIG. 1, or incorporated into multi-purpose platforms, such as set-top boxes, personal computers, and the like.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or component may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is claimed is:

1. A method for reducing interference from initializing network devices in a data-over-cable system having a plurality of upstream channels, the method comprising:
   aligning a plurality of maintenance intervals, wherein each maintenance interval of the plurality of maintenance intervals is associated with a corresponding upstream channel of the plurality of upstream channels;
   instructing the initializing network devices to range during the corresponding maintenance intervals of the plurality of maintenance intervals; and
   wherein the aligning step comprises the steps of:
   determining a measure of common maintenance start time for the plurality of maintenance intervals;
   deciding whether the measure of common maintenance start time falls within a plurality of usage intervals, wherein each usage interval of the plurality of usage intervals is associated with an upstream channel of the plurality of upstream channels; and
   when the measure of common maintenance start time falls within the plurality of usage intervals, scheduling the plurality of maintenance intervals to start at the measure of common maintenance start time; and
   wherein the determining step comprises the steps of:
   receiving a measure of present time, $T_P$;
   calculating the measure of common maintenance start time equal to expression $T_P+T_B-T_P \mod(T_B)$, wherein $T_B$ is a measure of a base insertion time for the plurality of maintenance intervals in the data-over-cable system.

2. The method of claim 1, wherein the deciding step comprises the steps of:
   receiving a measure of usage interval start time, $T_S$, for each usage interval of the plurality of usage intervals; and
   deciding whether the measure of common maintenance start time, $T_M$, satisfies expression $T_S \leq T_M < T_S+L$, for each usage interval of the plurality of usage intervals, wherein L is a measure of usage interval length for the usage interval.

3. The method of claim 1 wherein the aligning step comprises the steps of:
   identifying a longest maintenance interval from the plurality of maintenance intervals; and
   calculating a number of maintenance intervals, N, that can occur during the longest maintenance interval for each upstream channel of the plurality of upstream channels.

4. The method of claim 3 wherein the deciding step comprises the steps of:
   receiving a measure of usage interval start time, $T_S$, for each usage interval of the plurality of usage intervals; and
   deciding whether the measure of common maintenance start time, $T_M$, satisfies expression $T_S \leq T_M < T_S+L$, for each usage interval of the plurality of usage intervals, wherein L is a measure of usage interval length for the usage interval.

5. The method of claim 3 wherein the scheduling step comprises the steps of:
   constructing a plurality of information elements, wherein each information element of plurality of information elements corresponds to a maintenance interval of the plurality of maintenance intervals; and
   incorporating each information element of the plurality of information elements into an Upstream Bandwidth Allocation Map message, wherein the Upstream Bandwidth Allocation Map message corresponds to a usage interval of the plurality of usage intervals, and wherein the information element contains an offset corresponding to the measure of common maintenance a start time.

6. The method of claim 3 wherein the plurality of maintenance intervals is a plurality of Initial Maintenance intervals.

7. The method of claim 3 further comprising the step of:
   scheduling upstream transmissions within each usage interval of the plurality of intervals before the measure of common maintenance start time.

8. The method of claim 3 further comprising the step of:
   scheduling upstream transmissions within each usage interval of the plurality of intervals after the measure of common maintenance start time.
   aligning a plurality of maintenance intervals, wherein each maintenance interval of the plurality of maintenance intervals is associated with a corresponding upstream channel of the plurality of upstream channels; and
   instructing the initializing network devices to range during the corresponding maintenance interval of the plurality of maintenance intervals.

9. A method for reducing interference from initializing network devices in a data-over-cable system having a plurality of upstream channels, the method comprising:
   receiving a measure of present time, $T_P$;
   calculating a measure of common maintenance start time, $T_M$, equal to expression $T_P+T_B-T_P \mod(T_B)$, wherein $T_B$ is a measure of a base insertion time for a plurality of maintenance intervals in the data-over-cable system;
   receiving a measure of usage interval start time, $T_S$, for each usage interval of a plurality of usage intervals;
   deciding whether the measure of common maintenance start time, $T_M$, satisfies expression $T_S \leq T_M < T_S=L$, for each usage interval of the plurality of usage intervals, wherein L is a measure of usage interval length for the usage interval;

when the measure of common maintenance start time, $T_M$, satisfies expression $T_S \leq T_M < T_P + L$, for each usage interval of the plurality of usage intervals, scheduling the plurality of maintenance intervals to start at the measure of common maintenance start time; and instructing the initializing network devices to range during the plurality of maintenance intervals.

10. A computer readable medium, having stored therein instructions for causing a central processing unit to execute the method of claim 9.

11. A method for reducing interference from initializing network devices in a data-over-cable system having a plurality of upstream channels, the method comprising:

receiving a measure of present time, $T_P$;

calculating a measure of common maintenance start time, $T_M$, equal to expression $T_P + T_B - T_P \bmod(T_B)$, wherein $T_B$ is a measure of a base insertion time for a plurality of maintenance intervals in the data-over-cable system;

identifying a longest maintenance interval from the plurality of maintenance intervals;

calculating a number of maintenance intervals, N, that can occur during the longest maintenance interval for each upstream channel of the plurality of upstream channels;

receiving a measure of usage interval start time, $T_S$, for each usage interval of a plurality of usage intervals;

deciding whether the measure of common maintenance start time, $T_M$, satisfies expression $T_S \leq T_M < T_S + L$, for each usage interval of the plurality of usage intervals, wherein is L is a measure of usage interval length for the usage interval;

when the measure of common maintenance start time, $T_M$, satisfies expression $T_S \leq T_M < T_S + L$, for each usage interval of the plurality of usage intervals, scheduling N maintenance intervals to start at the measure of common maintenance start time; and instructing the initializing network devices to range during the plurality of maintenance intervals.

12. A computer readable medium, having stored therein instructions for causing a central processing unit to execute the method of claim 11.

* * * * *